US012187312B2

(12) United States Patent
Govardhanam

(10) Patent No.: US 12,187,312 B2
(45) Date of Patent: Jan. 7, 2025

(54) MEASURING ENVIRONMENTAL DIVERGENCE IN A SIMULATION USING OBJECT OCCLUSION ESTIMATION

(71) Applicant: GM Cruise Holdings LLC, San Francisco, CA (US)

(72) Inventor: Hariprasad Govardhanam, Fremont, CA (US)

(73) Assignee: GM Cruise Holdings LLC, San Francisco, CA (US)

( * ) Notice: Subject to any disclaimer, the term of this patent is extended or adjusted under 35 U.S.C. 154(b) by 161 days.

(21) Appl. No.: 17/983,256

(22) Filed: Nov. 8, 2022

(65) Prior Publication Data

US 2024/0149907 A1     May 9, 2024

(51) Int. Cl.
*G06F 17/00* (2019.01)
*B60W 60/00* (2020.01)

(52) U.S. Cl.
CPC ..... *B60W 60/001* (2020.02); *B60W 2420/408* (2024.01); *B60W 2554/4041* (2020.02); *B60W 2554/4048* (2020.02); *B60W 2554/4049* (2020.02)

(58) Field of Classification Search
CPC ......... B60W 60/001; B60W 2420/408; B60W 2554/4041; B60W 2554/4048; B60W 2554/4049
USPC ......................................................... 701/23
See application file for complete search history.

(56) References Cited

U.S. PATENT DOCUMENTS

| 11,830,259 B2* | 11/2023 | Ren ..................... G06V 40/172 |
| 11,927,965 B2* | 3/2024 | Ebrahimi Afrouzi ....................... G06F 3/04845 |
| 2023/0065399 A1* | 3/2023 | Ren ........................ G16H 30/40 |
| 2024/0087341 A1* | 3/2024 | Ren .......................... G06F 18/21 |
| 2024/0149907 A1* | 5/2024 | Govardhanam .... B60W 60/001 |

OTHER PUBLICATIONS

Overcoming Blind Spots Occlusion Considerations for Improved (Year: 2024).*

* cited by examiner

*Primary Examiner* — Ronnie M Mancho

(57) ABSTRACT

Aspects of the disclosed technology provide solutions for measuring divergence between recorded real-world scene data, and a simulated environment. A process of the disclosed technology can include steps for generating, based on real-world autonomous vehicle (AV) scene data, a computer-generated simulation of a real-world scenario, determining, an occlusion region in which at least one surrounding object obstructs a field of view of the AV, and determining, based on the occlusion region, a portion of the object of interest that is visible to the AV. In some aspects, the process can further include steps for determining a divergence value indicating a difference between the portion of the object of interest that is visible to the AV within the simulation of the real-world scenario to an actual portion of the object of interest that is visible to the AV within the real-world scenario. Systems and machine-readable media are also provided.

20 Claims, 10 Drawing Sheets

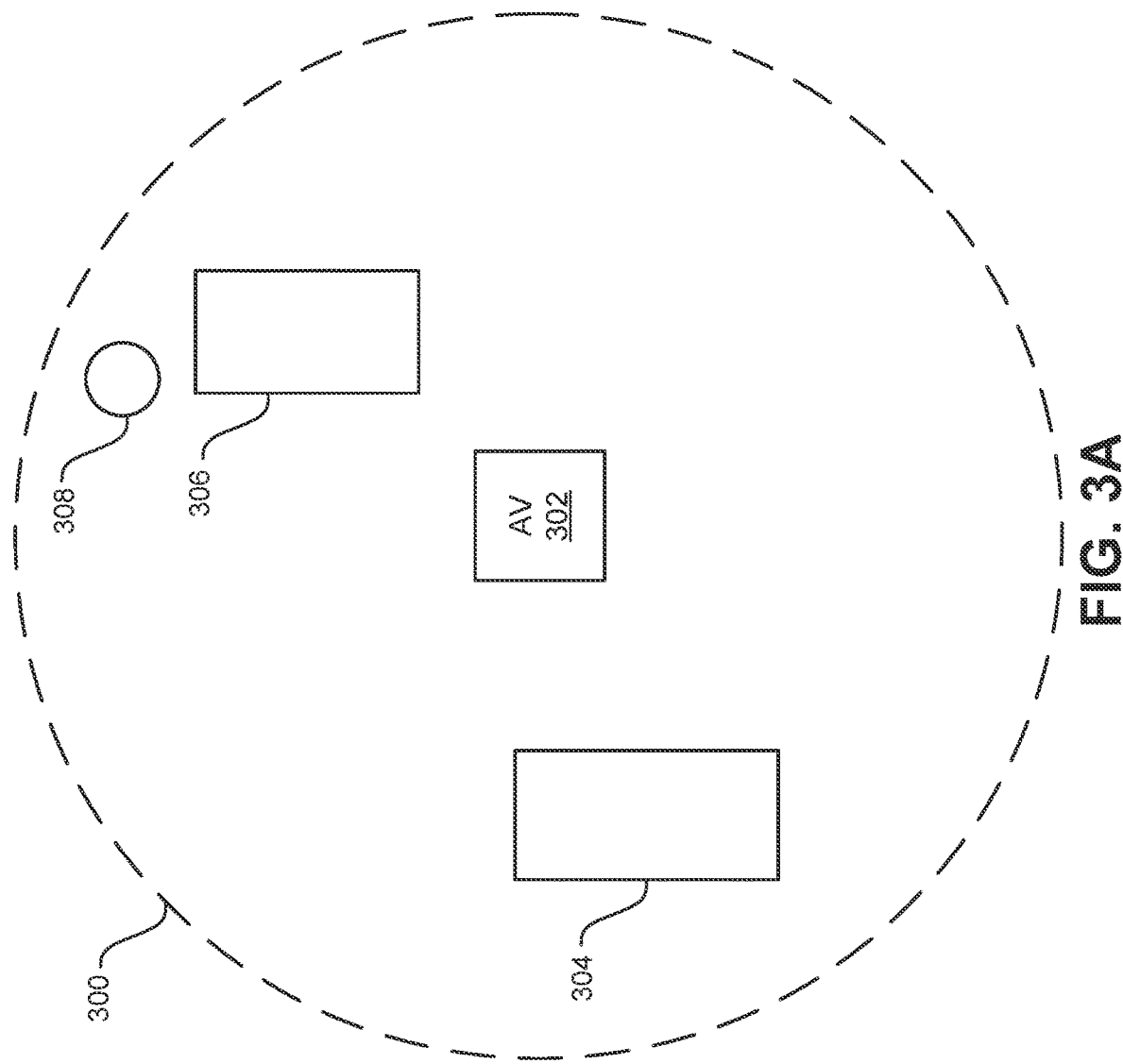

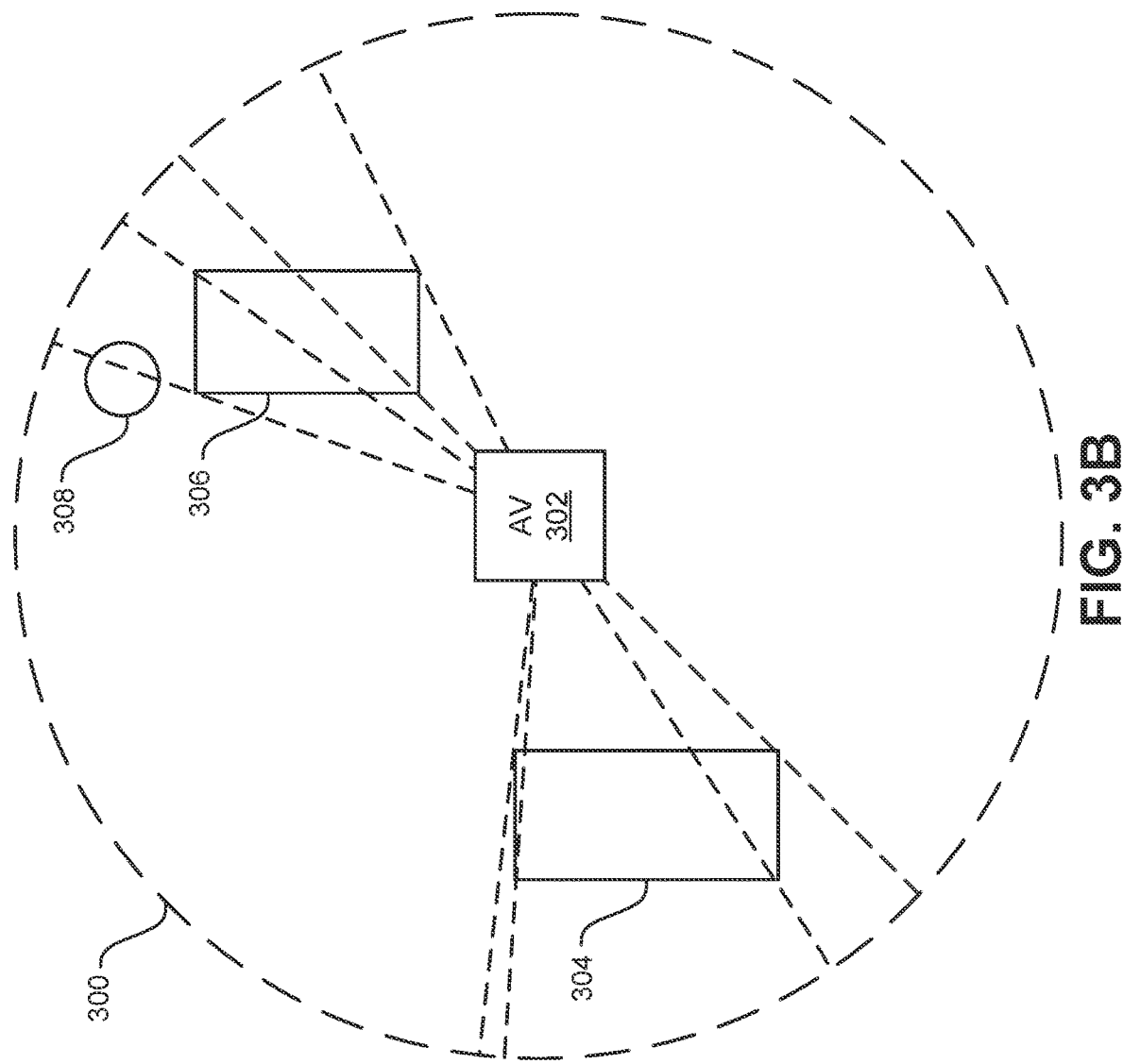

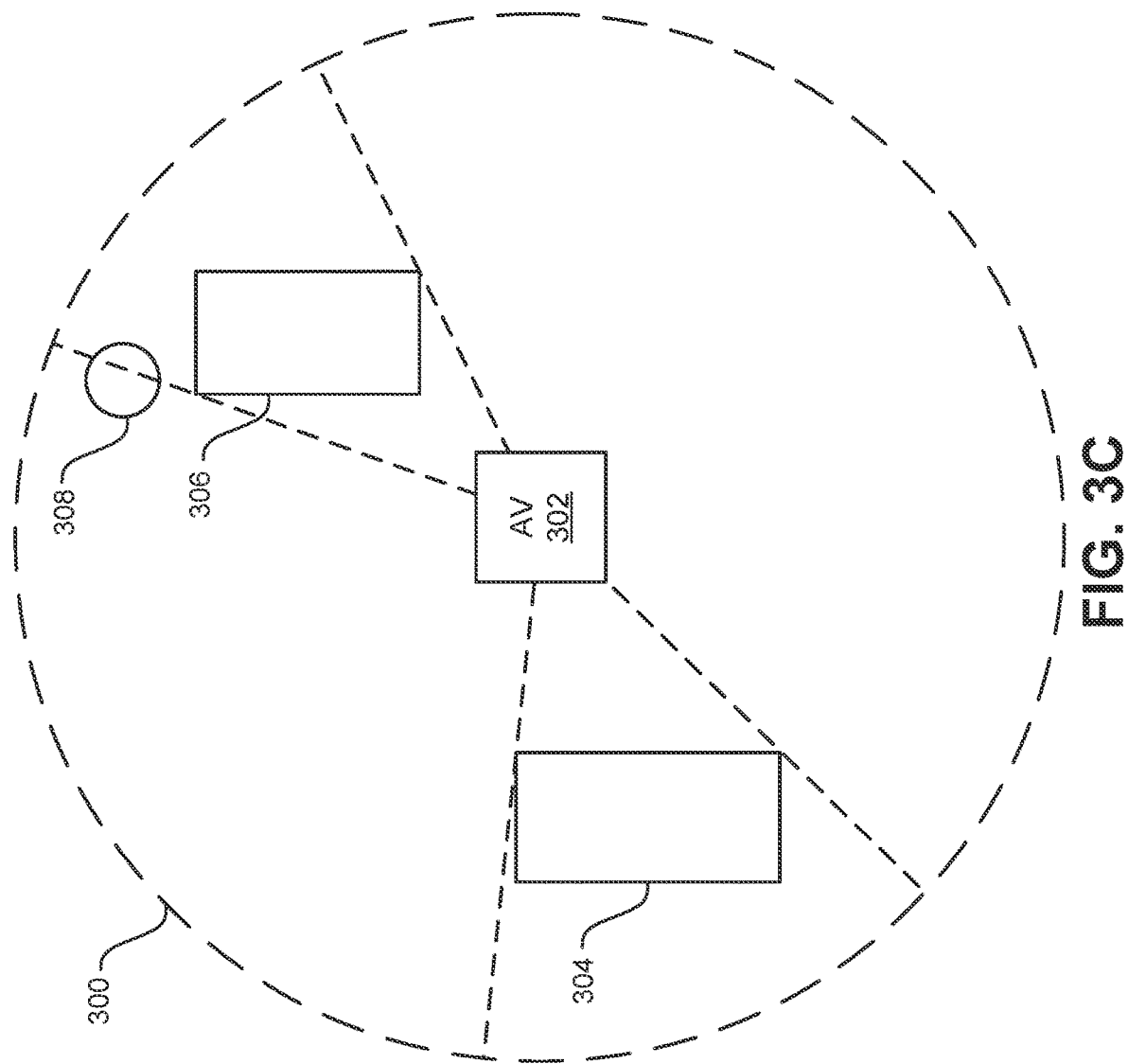

MEASURING ENVIRONMENTAL DIVERGENCE IN A SIMULATION USING OBJECT OCCLUSION ESTIMATION

BACKGROUND

1. Technical Field

The present disclosure generally relates to autonomous vehicles and, more specifically, to measuring environmental divergence in a simulation environment based on an object occlusion estimation.

2. Introduction

An autonomous vehicle is a motorized vehicle that can navigate without a human driver. An exemplary autonomous vehicle can include various sensors, such as a camera sensor, a light detection and ranging (LIDAR) sensor, and a radio detection and ranging (RADAR) sensor, amongst others. The sensors collect data and measurements that the autonomous vehicle can use for operations such as navigation. The sensors can provide the data and measurements to an internal computing system of the autonomous vehicle, which can use the data and measurements to control a mechanical system of the autonomous vehicle, such as a vehicle propulsion system, a braking system, or a steering system. For example, the internal computing system may utilize machine learning models to interpret the data and measurements and decide on what actions should be performed to maintain a safe and comfortable riding experience.

BRIEF DESCRIPTION OF THE DRAWINGS

The various advantages and features of the present technology will become apparent by reference to specific implementations illustrated in the appended drawings. A person of ordinary skill in the art will understand that these drawings only show some examples of the present technology and would not limit the scope of the present technology to these examples. Furthermore, the skilled artisan will appreciate the principles of the present technology as described and explained with additional specificity and detail through the use of the accompanying drawings in which:

FIGS. 3A-3D conceptually illustrate a process for determining visibility of an object in a simulated real-world environment based on occlusion regions, according to some examples of the present disclosure.

DETAILED DESCRIPTION

Figure 1:
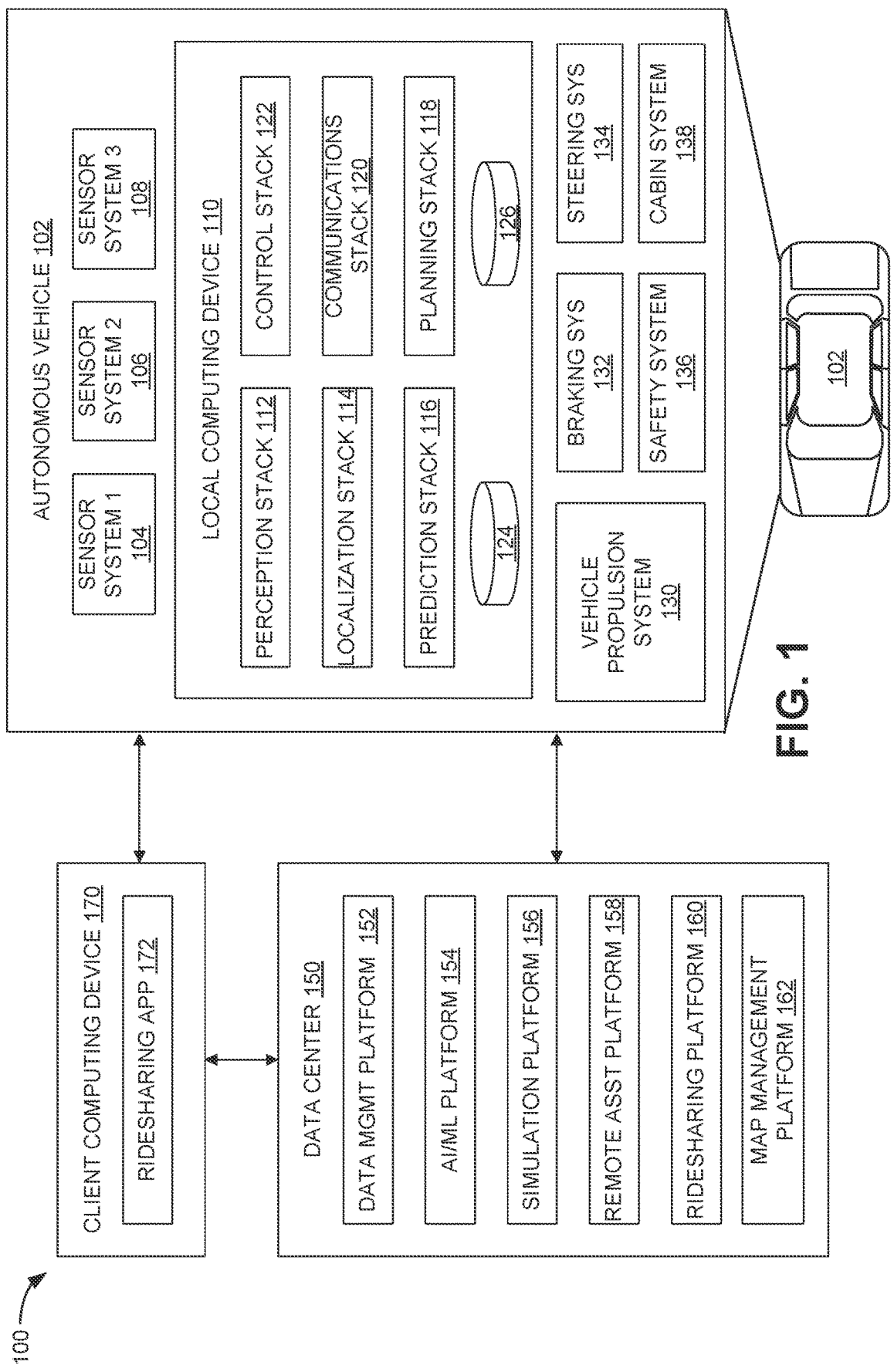
FIG. 1 is a diagram illustrating an example autonomous vehicle (AV) management system, according to some examples of the present disclosure.

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a more thorough understanding of the subject technology. However, it will be clear and apparent that the subject technology is not limited to the specific details set forth herein and may be practiced without these details. In some instances, structures and components are shown in block diagram form in order to avoid obscuring the concepts of the subject technology.

One aspect of the present technology is the gathering and use of data available from various sources to improve quality and experience. The present disclosure contemplates that in some instances, this gathered data may include personal information. The present disclosure contemplates that the entities involved with such personal information respect and value privacy policies and practices.

Autonomous vehicles (AVs), also known as self-driving cars, driverless vehicles, and robotic vehicles, are vehicles that use sensors to sense the current environment of the AVs (e.g., AV scenes) and move without human input. For example, AVs can include sensors such as a camera sensor, a LIDAR sensor, and/or a RADAR sensor, amongst others, which the AVs can use to collect AV scene data (e.g., sensor data and measurements) that is used for various AV operations. The sensors can provide the AV scene data to an internal computing system of the AV, which can then use the AV scene data to control mechanical systems of the AV, such as a vehicle propulsion system, a braking system, and/or a steering system, etc. For example, the internal computing system may use the AV scene data as input into machine learning models that interpret the AV scene data and provide outputs which are used to decide what actions should be performed to maintain a safe and comfortable riding experience.

The machine learning models (e.g., machine learning algorithms) used by AVs are generated (e.g., trained) using AV scene data (also: real-world AV scene data) that is gathered during operation of multiple AVs. The real-world AV scene data can include a variety of data types, including but not limited to sensor data that is collected using one or more AV sensors and/or localization telemetry systems. By way of example, AV sensors may include one or more Light Detection and Ranging (LiDAR) sensors, Radio Detection and Ranging (RADAR) sensors, camera sensors, ultrasonic sensors and/or accelerometers, e.g., one or more Inertial Measurement Units (IMUs), etc. Localization may be performed using one or more localization systems (or subsystems) such as a satellite based positioning system, such as a Global Positioning System (GPS) or Global Navigation Satellite System (GNSS), and/or using a high-resolution map including point-cloud data and/or image data for an environment around the AV. Further details regarding the use of AV sensor systems for collecting sensor and/or localization data are discussed in further detail with respect to FIG. 1, below.

The AV scene data describes the real-world environment of the AVs as they operate in various real-world scenarios. A scenario may be a specified time period, such as 1 second 10 seconds, 30 seconds, 1 minute, and the like. The AV scene data may describe the location, speed and trajectory of the AV and objects present in the surrounding environment of the AV during the various real-world scenarios. The performance of the machine learning models in a particular scenario is related to the amount of AV scene data describing the same or a similar scenario that was used to train the machine learning model. For example, the performance of a machine learning model in a particular scenario is improved as the amount of AV scene data describing a same or similar scenario is used to train/retrain the machine learning model.

One challenge with training machine learning models for use with AVs is capturing adequate amounts of AV scene data to properly train the machine learning models to operate in various scenarios. For example, certain scenarios, such as a pedestrian unexpectedly running across the street or a vehicle running a red light may occur infrequently during daily driving. As a result, capturing a sufficient or desired amount of real-world AV scene data describing these scenarios to train machine learning models may take a long time.

A simulation platform can be used to generate synthetic AV scene data to increase the speed at which training data is captured and available for training machine learning models for use in AVs. A simulation platform generates computer-generated simulations of real-world scenarios from which synthetic AV scene data describing the location, speed, and trajectory of the AV and objects present in the surrounding environment of the AV can be captured during the simulation of the real-world scenario. The resulting synthetic AV scene data can then be used to train the machine learning models to operate in similar real-world scenarios. While use of synthetic AV scene data substantially increases the speed at which the training data can be captured, the value in doing so is dependent on the accuracy of the simulated scenarios generated by the simulation platform. For example, if the simulated scenario does not accurately represent a real-world scenario, the resulting synthetic AV scene data may not be suitable to train a machine learning model to operate in similar real-world environments.

The simulation platform can validate the accuracy of the simulations it generates using available real-world AV data. For example, the simulation platform can generate a simulation of a real-world scenario for which real-world AV scene data has been captured by an AV. The AV scene data can then be compared with a synthetic AV scene corresponding with the real-world AV data to validate that the simulation is operating in a sufficiently accurate manner. For example, the simulation platform compares the synthetic AV scene data to the real-world AV scene data to ensure that the AV and objects in the simulation reacted to the scenario in the same manner as occurred in the real-world.

One factor that is important to accurately simulating a real-world scenario is to accurately recreate properties relating to the visibility of the objects at various positions within the simulated scenario. For example, an AV encountering a pedestrian walking across the street presents significantly different scenarios depending on whether the pedestrian is fully visible to the AV versus only partially visible to the AV. Even slight differences in the proportion of visibility of the object to the AV at a given moment (e.g., 20% visible versus 40% visible) may represent vastly different scenarios. Therefore, ensuring that the visibility of objects to the AV matches or is substantially similar to the visibility of the AV in the real-world environment is crucial to generating accurate simulations of real-world environments.

To validate that the visibility of the objects to an AV in a simulation matches or is substantially similar to the visibility of the objects to the AV in a real-world scenario, the simulation platform determines occlusion regions within the simulated scenario that represent portions of the AVs surrounding environment that are not visible to the AV. For example, the AV's visibility of some regions may be blocked or obstructed due to the presence of objects (e.g., vehicles, buildings, trees, etc.) in the AV's surrounding environment. The simulation platform uses the occlusion regions to determine a visible portion of the objects to the AV at a given moment in the simulated scenario and compares to the determined visible portion of the object to the known visible portion of the object as determined based on the real-world AV scene data of the real-world scenario. The determined variance between the determined visible portion of the object and the known visible portion of the object can be used to gauge/validate the accuracy of the simulation platform at simulating real-world scenarios and/or to further improve performance of the simulation platform.

The simulation platform determines the occlusion regions within a simulation by identifying the corner points of the objects present within the simulated scenario. The simulation platform then projects rays from the position of the AV that intersect with the corner points of each object. The resulting rays and position of the objects in relation to the AV may then be used to determine the occlusion regions in which the visibility of the AV is obstructed by the objects. The determined occlusion regions may then be compared to bounding boxes representing the size and location of an object within the simulation of the real-world scenario to determine a visible portion of the object to the AV within the simulation. For example, the visible portion of the object to the AV may indicate a percentage or proportion of the bounding box for the object that does not fall within any of the occlusion regions.

FIG. 1 is a diagram illustrating an example autonomous vehicle (AV) management system 100, according to some examples of the present disclosure. One of ordinary skill in the art will understand that, for the AV management system 100 and any system discussed in the present disclosure, there can be additional or fewer components in similar or alternative configurations. The illustrations and examples provided in the present disclosure are for conciseness and clarity. Other examples may include different numbers and/or types of elements, but one of ordinary skill in the art will appreciate that such variations do not depart from the scope of the present disclosure.

In this example, the AV management system 100 includes an AV 102, a data center 150, and a client computing device 170. The AV 102, the data center 150, and the client computing device 170 can communicate with one another over one or more networks (not shown), such as a public network (e.g., the Internet, an Infrastructure as a Service (IaaS) network, a Platform as a Service (PaaS) network, a Software as a Service (SaaS) network, other Cloud Service Provider (CSP) network, etc.), a private network (e.g., a Local Area Network (LAN), a private cloud, a Virtual Private Network (VPN), etc.), and/or a hybrid network (e.g., a multi-cloud or hybrid cloud network, etc.).

The AV 102 can navigate roadways without a human driver based on sensor signals generated by multiple sensor systems 104, 106, and 108. The sensor systems 104-108 can include one or more types of sensors and can be arranged about the AV 102. For instance, the sensor systems 104-108 can include Inertial Measurement Units (IMUs), cameras (e.g., still image cameras, video cameras, etc.), light sensors (e.g., LIDAR systems, ambient light sensors, infrared sensors, etc.), RADAR systems, GPS receivers, audio sensors (e.g., microphones, Sound Navigation and Ranging (SONAR) systems, ultrasonic sensors, etc.), engine sensors, speedometers, tachometers, odometers, altimeters, tilt sensors, impact sensors, airbag sensors, seat occupancy sensors, open/closed door sensors, tire pressure sensors, rain sensors, and so forth. For example, the sensor system 104 can be a camera system, the sensor system 106 can be a LIDAR system, and the sensor system 108 can be a RADAR system. Other examples may include any other number and type of sensors.

The AV 102 can also include several mechanical systems that can be used to maneuver or operate the AV 102. For instance, the mechanical systems can include a vehicle propulsion system 130, a braking system 132, a steering system 134, a safety system 136, and a cabin system 138, among other systems. The vehicle propulsion system 130 can include an electric motor, an internal combustion engine, or both. The braking system 132 can include an engine brake, brake pads, actuators, and/or any other suitable componentry configured to assist in decelerating the AV 102. The steering system 134 can include suitable componentry configured to control the direction of movement of the AV 102 during navigation. The safety system 136 can include lights and signal indicators, a parking brake, airbags, and so forth. The cabin system 138 can include cabin temperature control systems, in-cabin entertainment systems, and so forth. In some examples, the AV 102 might not include human driver actuators (e.g., steering wheel, handbrake, foot brake pedal, foot accelerator pedal, turn signal lever, window wipers, etc.) for controlling the AV 102. Instead, the cabin system 138 can include one or more client interfaces (e.g., Graphical User Interfaces (GUIs), Voice User Interfaces (VUIs), etc.) for controlling certain aspects of the mechanical systems 130-138.

The AV 102 can include a local computing device 110 that is in communication with the sensor systems 104-108, the mechanical systems 130-138, the data center 150, and the client computing device 170, among other systems. The local computing device 110 can include one or more processors and memory, including instructions that can be executed by the one or more processors. The instructions can make up one or more software stacks or components responsible for controlling the AV 102; communicating with the data center 150, the client computing device 170, and other systems; receiving inputs from riders, passengers, and other entities within the AV's environment; logging metrics collected by the sensor systems 104-108; and so forth. In this example, the local computing device 110 includes a perception stack 112, a mapping and localization stack 114, a prediction stack 116, a planning stack 118, a communications stack 120, a control stack 122, an AV operational database 124, and an HD geospatial database 126, among other stacks and systems.

The perception stack 112 can enable the AV 102 to "see" (e.g., via cameras, LIDAR sensors, infrared sensors, etc.), "hear" (e.g., via microphones, ultrasonic sensors, RADAR, etc.), and "feel" (e.g., pressure sensors, force sensors, impact sensors, etc.) its environment using information from the sensor systems 104-108, the mapping and localization stack 114, the HD geospatial database 126, other components of the AV, and other data sources (e.g., the data center 150, the client computing device 170, third party data sources, etc.). The perception stack 112 can detect and classify objects and determine their current locations, speeds, directions, and the like. In addition, the perception stack 112 can determine the free space around the AV 102 (e.g., to maintain a safe distance from other objects, change lanes, park the AV, etc.). The perception stack 112 can identify environmental uncertainties, such as where to look for moving objects, flag areas that may be obscured or blocked from view, and so forth. In some examples, an output of the prediction stack can be a bounding area (e.g., bounding box) around a perceived object that can be associated with a semantic label that identifies the type of object that is within the bounding area, the kinematic of the object (information about its movement), a tracked path of the object, and a description of the pose of the object (its orientation or heading, etc.).

The mapping and localization stack 114 can determine the AV's position and orientation (pose) using different methods from multiple systems (e.g., GPS, IMUs, cameras, LIDAR, RADAR, ultrasonic sensors, the HD geospatial database 126, etc.). For example, in some cases, the AV 102 can compare sensor data captured in real-time by the sensor systems 104-108 to data in the HD geospatial database 126 to determine its precise (e.g., accurate to the order of a few centimeters or less) position and orientation. The AV 102 can focus its search based on sensor data from one or more first sensor systems (e.g., GPS) by matching sensor data from one or more second sensor systems (e.g., LIDAR). If the mapping and localization information from one system is unavailable, the AV 102 can use mapping and localization information from a redundant system and/or from remote data sources.

The prediction stack 116 can receive information from the localization stack 114 and objects identified by the perception stack 112 and predict a future path for the objects. In some examples, the prediction stack 116 can output several likely paths that an object is predicted to take along with a probability associated with each path. For each predicted path, the prediction stack 116 can also output a range of points along the path corresponding to a predicted location of the object along the path at future time intervals along with an expected error value for each of the points that indicates a probabilistic deviation from that point.

The planning stack 118 can determine how to maneuver or operate the AV 102 safely and efficiently in its environment. For example, the planning stack 118 can receive the location, speed, and direction of the AV 102, geospatial data, data regarding objects sharing the road with the AV 102 (e.g., pedestrians, bicycles, vehicles, ambulances, buses, cable cars, trains, traffic lights, lanes, road markings, etc.) or certain events occurring during a trip (e.g., emergency vehicle blaring a siren, intersections, occluded areas, street closures for construction or street repairs, double-parked cars, etc.), traffic rules and other safety standards or practices for the road, user input, and other relevant data for directing the AV 102 from one point to another and outputs from the perception stack 112, localization stack 114, and prediction stack 116. The planning stack 118 can determine multiple sets of one or more mechanical operations that the AV 102 can perform (e.g., go straight at a specified rate of acceleration, including maintaining the same speed or decelerating; turn on the left blinker, decelerate if the AV is above a threshold range for turning, and turn left; turn on the right blinker, accelerate if the AV is stopped or below the threshold range for turning, and turn right; decelerate until completely stopped and reverse; etc.), and select the best one to meet changing road conditions and events. If something unexpected happens, the planning stack 118 can select from multiple backup plans to carry out. For example, while preparing to change lanes to turn right at an intersection, another vehicle may aggressively cut into the destination lane, making the lane change unsafe. The planning stack 118 could have already determined an alternative plan for such an event. Upon its occurrence, it could help direct the AV 102 to go around the block instead of blocking a current lane while waiting for an opening to change lanes.

The control stack 122 can manage the operation of the vehicle propulsion system 130, the braking system 132, the steering system 134, the safety system 136, and the cabin system 138. The control stack 122 can receive sensor signals from the sensor systems 104-108 as well as communicate with other stacks or components of the local computing device 110 or a remote system (e.g., the data center 150) to effectuate operation of the AV 102. For example, the control stack 122 can implement the final path or actions from the multiple paths or actions provided by the planning stack 118. This can involve turning the routes and decisions from the planning stack 118 into commands for the actuators that control the AV's steering, throttle, brake, and drive unit.

The communications stack 120 can transmit and receive signals between the various stacks and other components of the AV 102 and between the AV 102, the data center 150, the client computing device 170, and other remote systems. The communications stack 120 can enable the local computing device 110 to exchange information remotely over a network, such as through an antenna array or interface that can provide a metropolitan WIFI network connection, a mobile or cellular network connection (e.g., Third Generation (3G), Fourth Generation (4G), Long-Term Evolution (LTE), 5th Generation (5G), etc.), and/or other wireless network connection (e.g., License Assisted Access (LAA), Citizens Broadband Radio Service (CBRS), MULTEFIRE, etc.). The communications stack 120 can also facilitate the local exchange of information, such as through a wired connection (e.g., a user's mobile computing device docked in an in-car docking station or connected via Universal Serial Bus (USB), etc.) or a local wireless connection (e.g., Wireless Local Area Network (WLAN), Bluetooth®, infrared, etc.).

The HD geospatial database 126 can store HD maps and related data of the streets upon which the AV 102 travels. In some examples, the HD maps and related data can comprise multiple layers, such as an areas layer, a lanes and boundaries layer, an intersections layer, a traffic controls layer, and so forth. The areas layer can include geospatial information indicating geographic areas that are drivable (e.g., roads, parking areas, shoulders, etc.) or not drivable (e.g., medians, sidewalks, buildings, etc.), drivable areas that constitute links or connections (e.g., drivable areas that form the same road) versus intersections (e.g., drivable areas where two or more roads intersect), and so on. The lanes and boundaries layer can include geospatial information of road lanes (e.g., lane centerline, lane boundaries, type of lane boundaries, etc.) and related attributes (e.g., direction of travel, speed limit, lane type, etc.). The lanes and boundaries layer can also include three-dimensional (3D) attributes related to lanes (e.g., slope, elevation, curvature, etc.). The intersections layer can include geospatial information of intersections (e.g., crosswalks, stop lines, turning lane centerlines and/or boundaries, etc.) and related attributes (e.g., permissive, protected/permissive, or protected only left turn lanes; legal or illegal u-turn lanes; permissive or protected only right turn lanes; etc.). The traffic controls lane can include geospatial information of traffic signal lights, traffic signs, and other road objects and related attributes.

The AV operational database 124 can store AV scene data, including raw AV data generated by the sensor systems 104-108, stacks 112-122, and other components of the AV 102 and/or data received by the AV 102 from remote systems (e.g., the data center 150, the client computing device 170, etc.). In some examples, the raw AV data can include HD LIDAR point cloud data, image data, RADAR data, GPS data, and other sensor data that the data center 150 can use for creating or updating AV geospatial data or for creating simulations of situations encountered by AV 102 for future testing or training of various machine learning algorithms that are incorporated in the local computing device 110.

The data center 150 can include a private cloud (e.g., an enterprise network, a co-location provider network, etc.), a public cloud (e.g., an Infrastructure as a Service (IaaS) network, a Platform as a Service (PaaS) network, a Software as a Service (SaaS) network, or other Cloud Service Provider (CSP) network), a hybrid cloud, a multi-cloud, and/or any other network. The data center 150 can include one or more computing devices remote to the local computing device 110 for managing a fleet of AVs and AV-related services. For example, in addition to managing the AV 102, the data center 150 may also support a ridesharing service, a delivery service, a remote/roadside assistance service, street services (e.g., street mapping, street patrol, street cleaning, street metering, parking reservation, etc.), and the like.

The data center 150 can send and receive various signals to and from the AV 102 and the client computing device 170. These signals can include sensor data captured by the sensor systems 104-108 (e.g., AV scene data), roadside assistance requests, software updates, ridesharing pick-up and drop-off instructions, and so forth. In this example, the data center 150 includes a data management platform 152, an Artificial Intelligence/Machine Learning (AI/ML) platform 154, a simulation platform 156, a remote assistance platform 158, and a ridesharing platform 160, and a map management platform 162, among other systems.

The data management platform 152 can be a "big data" system capable of receiving and transmitting data at high velocities (e.g., near real-time or real-time), processing a large variety of data and storing large volumes of data (e.g., terabytes, petabytes, or more of data). The varieties of data can include data having different structures (e.g., structured, semi-structured, unstructured, etc.), data of different types (e.g., sensor data, mechanical system data, ridesharing service, map data, audio, video, etc.), data associated with different types of data stores (e.g., relational databases, key-value stores, document databases, graph databases, column-family databases, data analytic stores, search engine databases, time series databases, object stores, file systems, etc.), data originating from different sources (e.g., AVs, enterprise systems, social networks, etc.), data having different rates of change (e.g., batch, streaming, etc.), and/or data having other characteristics. The various platforms and systems of the data center 150 can access data stored by the data management platform 152 to provide their respective services.

The AI/ML platform 154 can provide the infrastructure for training and evaluating machine learning algorithms (e.g., machine learning models) for operating the AV 102, the simulation platform 156, the remote assistance platform 158, the ridesharing platform 160, the map management platform 162, and other platforms and systems. Using the AI/ML platform 154, data scientists can prepare data sets from the data management platform 152; select, design, and train machine learning models; evaluate, refine, and deploy the models; maintain, monitor, and retrain the models; and so on.

The simulation platform 156 can enable testing and validation of the algorithms, machine learning models, neural networks, and other development efforts for the AV 102, the remote assistance platform 158, the ridesharing platform 160, the map management platform 162, and other platforms and systems. Simulation platform 156 can replicate a variety of driving environments and/or reproduce real-world scenarios from AV scene data captured by the AV 102, including rendering geospatial information and road infrastructure (e.g., streets, lanes, crosswalks, traffic lights, stop signs, etc.) obtained from a cartography platform (e.g., map management platform 162); modeling the behavior of other vehicles, bicycles, pedestrians, and other dynamic elements; simulating inclement weather conditions, different traffic scenarios; and so on.

As discussed above, the simulation platform 156 can be used to generate synthetic AV scene data to increase the speed at which training data is captured and available for training machine learning models. For example, the simulation platform 156 generates computer-generated simulations of real-world scenarios from which synthetic AV scene data describing the location, speed, and trajectory of the AV and objects present in the surrounding environment of the AV can be captured. The resulting synthetic AV scene data can then be used to train the machine learning models to operate in similar real-world scenarios. While use of synthetic AV scene data substantially increases the speed at which the training data can be captured, the value in doing so is dependent on the accuracy of the simulated scenarios generated by simulation platform 156. For example, if the simulated scenario does not accurately represent the real-world scenario, the resulting synthetic AV scene data may not be suitable to train a machine learning model to operate in similar real-world environments.

The simulation platform 156 can validate the accuracy of the simulations it generates using available real-world AV data. For example, the simulation platform 156 can generate a simulation of a real-world scenario for which real-world AV scene data has been captured by an AV and compare the synthetic AV scene data generated during the simulation to the corresponding real-world AV data to validate that the simulation is operating in a sufficiently accurate manner as occurred in the real-world. For example, the simulation platform 156 may compare the synthetic AV scene data to the real-world AV scene data to ensure that the AV and objects in the simulation of the real-world environment reacted in the same manner as occurred and was observed in the real-world environment.

One factor that is important to accurately simulating a real-world scenario is the visibility of the objects to the AV at various moments with the real-world scenario. For example, an AV encountering a pedestrian walking across the street presents significantly different scenarios depending on whether the pedestrian is fully visible to the AV versus only partially visible to the AV. Even slight differences in the proportion of visibility of the object to the AV at a given moment (e.g., 20% visible versus 40% visible) may represent vastly different scenarios. Therefore, ensuring that the visibility of objects to the AV matches or is substantially similar to the visibility in the real-world environment is crucial to generating accurate simulations of a real-world environment.

To validate that the visibility of the objects to an AV in a simulation matches or is substantially similar to the visibility of the objects to the AV in a real-world scenario, the simulation platform 156 determines occlusion regions within the simulated scenario that represent portions of the AVs surrounding environment that are not visible to the AV. For example, the AV's visibility of some regions may be blocked or obstructed due to the presence of objects (e.g., vehicles, buildings, trees, etc.) in the AV's surrounding environment. The simulation platform 156 uses the occlusion regions to determine a visible portion of the object to the AV at a given moment in the simulated scenario and compares the determined visible portion of the object to the known visible portion of the object as determined based on the real-world scene data of the real-world scenario. The variance between the visible portion of the object determined from the simulation and the known visible portion of the object determined from the real-world AV scene data can be used to validate or gauge the performance of the simulation platform 156 at accurately simulating real-world environments and/or to further improve performance of the simulation platform 156.

Simulation platform 156 determines the occlusion regions within a simulated scenario by identifying the corner points of the objects present within the simulated scenario. The simulation platform 156 then projects rays from the position of the AV that intersect with the corner points of each object. The resulting rays and position of the objects in relation to the AV may then be used to determine the occlusion regions in which the visibility of the AV is obstructed by the objects. The determined occlusion regions may then be compared to bounding boxes representing the size and location of an object to determine a visible portion of the object to the AV within the simulation. For example, the visible portion of the object to the AV may indicate a percentage or proportion of the bounding box for the object that does not fall within any of the occlusion regions The functionality of the simulation platform 156 related to validating that the visibility of objects to an AV in a simulation matches or is substantially similar to the visibility of the objects to the AV in a real-world environment will be described in greater detail below in relation to FIGS. 2-5.

The remote assistance platform 158 can generate and transmit instructions regarding the operation of the AV 102. For example, in response to an output of the AI/ML platform 154 or other system of the data center 150, the remote assistance platform 158 can prepare instructions for one or more stacks or other components of the AV 102.

The ridesharing platform 160 can interact with a customer of a ridesharing service via a ridesharing application 172 executing on the client computing device 170. The client computing device 170 can be any type of computing system such as, for example and without limitation, a server, desktop computer, laptop computer, tablet computer, smartphone, smart wearable device (e.g., smartwatch, smart eyeglasses or other Head-Mounted Display (HMD), smart ear pods, or other smart in-ear, on-ear, or over-ear device, etc.), gaming system, or any other computing device for accessing the ridesharing application 172. The client computing device 170 can be a customer's mobile computing device or a computing device integrated with the AV 102 (e.g., the local computing device 110). The ridesharing platform 160 can receive requests to pick up or drop off from the ridesharing application 172 and dispatch the AV 102 for the trip.

Map management platform 162 can provide a set of tools for the manipulation and management of geographic and spatial (geospatial) and related attribute data. The data management platform 152 can receive LIDAR point cloud data, image data (e.g., still image, video, etc.), RADAR data, GPS data, and other sensor data (e.g., raw data) from one or more AVs 102, Unmanned Aerial Vehicles (UAVs), satellites, third-party mapping services, and other sources of geospatially referenced data. The raw data can be processed, and map management platform 162 can render base representations (e.g., tiles (2D), bounding volumes (3D), etc.) of the AV geospatial data to enable users to view, query, label, edit, and otherwise interact with the data. Map management platform 162 can manage workflows and tasks for operating on the AV geospatial data. Map management platform 162 can control access to the AV geospatial data, including granting or limiting access to the AV geospatial data based on user-based, role-based, group-based, task-based, and other attribute-based access control mechanisms. Map management platform 162 can provide version control for the AV geospatial data, such as to track specific changes that (human or machine) map editors have made to the data and to revert changes when necessary. Map management platform 162 can administer release management of the AV geospatial data, including distributing suitable iterations of the data to different users, computing devices, AVs, and other consumers of HD maps. Map management platform 162 can provide analytics regarding the AV geospatial data and related data, such as to generate insights relating to the throughput and quality of mapping tasks.

In some aspects, the map viewing services of map management platform 162 can be modularized and deployed as part of one or more of the platforms and systems of the data center 150. For example, the AI/ML platform 154 may incorporate the map viewing services for visualizing the effectiveness of various object detection or object classification models, the simulation platform 156 may incorporate the map viewing services for recreating and visualizing certain driving scenarios, the remote assistance platform 158 may incorporate the map viewing services for replaying traffic incidents to facilitate and coordinate aid, the ridesharing platform 160 may incorporate the map viewing services into the client application 172 to enable passengers to view the AV 102 in transit en route to a pick-up or drop-off location, and so on.

While the autonomous vehicle 102, the local computing device 110, and the autonomous vehicle environment 100 are shown to include certain systems and components, one of ordinary skill will appreciate that the autonomous vehicle 102, the local computing device 110, and/or the autonomous vehicle environment 100 can include more or fewer systems and/or components than those shown in FIG. 1. For example, the autonomous vehicle 102 can include other services than those shown in FIG. 1 and the local computing device 110 can also include, in some instances, one or more memory devices (e.g., RAM, ROM, cache, and/or the like), one or more network interfaces (e.g., wired and/or wireless communications interfaces and the like), and/or other hardware or processing devices that are not shown in FIG. 1. An illustrative example of a computing device and hardware components that can be implemented with the local computing device 110 is described below with respect to FIG. 7.

As noted above, the time it takes for an AV to process sensor input data may vary based on many different factors. For instance, the complexity of the environment surrounding the AV (e.g., scene complexity) can cause variations in compute time because of the amount of sensor data that is collected, and the processing time required to identify objects in the scene, predict behavior of the objects, etc. In some cases, an AV may initiate a safe stop if the AV determines that the latency in processing input data exceeds a safety threshold and/or a passenger comfort threshold.

Figure 2:
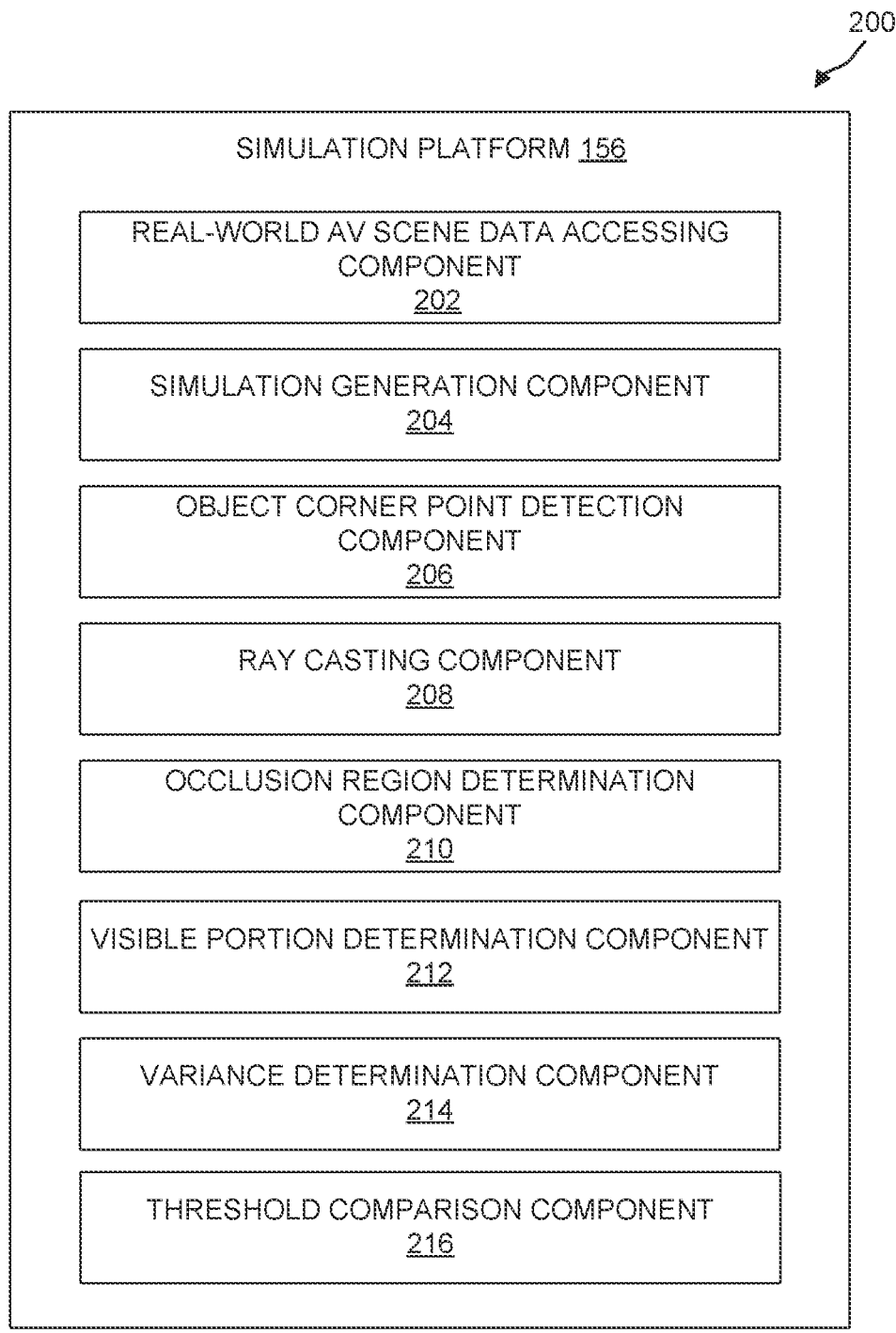
FIG. 2 is a block diagram of a simulation platform configured to validate visibility of the objects in a simulated real-world environment, according to some examples of the present disclosure.

FIG. 2 is a block diagram 200 of a simulation platform 156 configured to validate visibility of the objects in a simulated real-world environment, according to some examples of the present disclosure. As discussed earlier, the simulation platform 156 can be used to generate synthetic AV scene data to increase the speed at which training data is captured and available for training machine learning models used in AVs. To ensure the quality of the synthetic AV scene data, the simulation platform 156 validates the accuracy of the simulations it generates using available real-world AV scene data. For example, the simulation platform 156 validates that the visibility of the objects in a simulated scenario match or are substantially similar to the visibility of the objects as was observed in the real-world environment that is being simulated.

As shown, the simulation platform 156 includes a real-world AV scene data accessing component 202, a simulation generation component 204, an object corner point detection component 206, a ray casting component 208, an occlusion region determination component 210, a visible portion determination component 212, a variance determination component 214, and a threshold comparison component 216.

The real-world AV scene data accessing component 202 accesses real-world AV scene data that describes a real-world AV scenario. For example, the real-world AV scene data may include sensor data captured by sensors and/or generated by the various stacks of an AV that describe the surrounding environment of the AV during the real-world AV scenario, such as the location, size, trajectory, and speed of the AV and/or objects surrounding the AV in the real-world environment. The real-world AV scene data may also include labels and bounding boxes for the objects in the real-world environment. The labels identify the type of object, such as the whether the object is a vehicle, building, pedestrian and the like. The labels may be determined using machine learning models and/or be assigned by human reviewers. The bounding box for an object defines a geographic boundary of the object within the real-world scenario. For example, the bounding box indicates a size and shape of the object.

The real-world AV scene data accessing component 202 may provide the real-world AV scene data to the other components of the simulation platform 156, such as the simulation generation component 204.

The simulation generation component 204 generates simulations (or virtual representations) of real-world scenarios. For example, the simulation generation component 204 uses the real-world AV scene data, such as collected LiDAR and/or RADAR sensor data, to generate a simulation of the real-world scenario represented in the sensor data. This includes placement of the objects within the simulation to match the positions of the objects relative to the AV in the real-world scenario, as well as configuring the behavior of AV and the objects within the simulation in a manner that matches their behavior in the real-world scenario. For example, the simulation generation component 204 may configure the speed, trajectory and/or pose of the AV and the surrounding objects within the simulation to match the speed, trajectory and/or pose of the AV and the surrounding objects that occurred in the real-world scenario.

The object corner point detection component 206 identifies corner points of the objects included in the simulation of the real-world scenario. A corner point can represent a point on the edge of an object at which two or more sides or edges of the object meet at an angle. For example, an object such as a square or rectangle includes four corner points at which each side of the square or rectangle meet. As another example, a corner point may represent a point of a rounded object along which a tangent ray may be cast from the position of the AV. In some embodiments, the object corner point detection component 206 may determine the corner points of each object based on a bounding box associated with the object. As another example, the object corner point detection component 206 may determine the corner points based on the real-world AV scene data used to generate the simulation of the real-world scenario.

The ray casting component 208 generates rays within the simulation of the real-world scenario that originate from a position of the AV and intersect with the corner points of the objects identified by the object corner point detection component 206. Each ray is a straight line originating from the position of the AV towards one of the identified corner points.

The occlusion region determination component 210 determines occlusion regions within the simulated real-world environment that represent portions of the AVs surrounding environment that are not visible to the AV. The visibility of the AV is based on the ability of the AV's sensors to detect objects within a region. The AV's visibility of some regions may be blocked or obstructed due to the presence of objects (e.g., vehicles, buildings, trees, etc.) in the AV's surrounding environment.

The occlusion region determination component 210 determines the occlusion regions based on the rays generated by the ray casting component 208. For example, the occlusion region determination component 210 identifies a pair of outermost rays that are cast towards each identified object in the simulation of the AV scenario. The pair of outermost rays are the rays cast towards an object that do not fall within two of the other rays cast towards the object.

The occlusion region determination component 210 uses the pair of outermost rays to determine the occlusion region created by the corresponding object within the simulation of the AV scenario. For example, the occlusion region determination component 210 determines the occlusion region based on the position of the object in relation to the AV and the region of the simulated AV scenario that falls within the pair of outermost rays. As the object obstructs the visibility of the AV within the environment, the occlusion region created by the object is defined by the region within the pair of outermost rays cast towards the object that falls on the opposite side of the object from the position of the AV. In other words, the AV maintains visibility within the region that falls between AV and the object, but the visibility of the AV is obstructed in the region within the pair of rays cast towards the object that fall beyond the object from the AV. The occlusion region determination component 210 may determine the occlusion regions created by each object present within the simulation of the real-world scenario. The determined occlusion regions may then be used to determine the portions of each object that are visible to the AV within the simulation.

The visible portion determination component 212 determines the portion of an object that is visible to the AV within the simulated scenario based on the occlusion regions determined by the occlusion region determination component 210 and the bounding boxes defining the shape and position of the object. The portion of an object that is visible to the AV may be a numerical value that represent the percentage or proportion of the object that is visible to the AV. To determine the portion of an object that is visible to the AV within the simulated scenario, the visible portion determination component 212 determines a portion (e.g., percentage, proportion) of the bounding box of the object that falls within any of the occlusion regions and/or a portion of the bounding box that does not fall within any of the occlusion regions.

The variance determination component 214 determines a divergence value indicating a variance (e.g., difference) between the portion of an object (or bounding box enclosing the object) that is visible to the AV within the simulated scenario and the actual portion of the object that is visible to the AV within the real-world scenario. Depending on the desired implementation, the divergence value may be represented as a difference (e.g., in percentage of area, number of pixels, or point cloud data points) as between the area of the object (or associated bounding box region) that is visible to the AV in the real-world environment, and the area of the (same) object (or associated bounding box region) that is visible to the AV in the simulated scenario. The actual portion of the object visible to the AV (e.g., one or more AV sensors) within the real-world scenario may be determined based on the real-world AV scene data used to generate the simulation of the real-world scenario. The variance determination component 214 may compare the portion that is visible to the AV as determined by the visible portion determination component 212 to the actual portion of the object that is visible to the AV that is determined based on the real-world AV scene data to determine the divergence value.

The divergence value may be used to validate or otherwise gauge performance of the simulation platform 156 at generating simulations of real-world scenarios as well as be used to improve performance of the simulation platform 156. For example, the threshold comparison component 216 compares the divergence value to one or more threshold divergence values to gauge performance of the simulation platform 156. A divergence value that exceed a threshold divergence value may indicate poor or suboptimal performance of simulation platform 156 at accurately simulating a real-world scenario. Alternatively, divergence values that fall below a threshold divergence value may indicate the simulation platform 156 is accurately simulating a real-world scenario.

FIGS. 3A-3D illustrate determining visibility of an object of interest 308 in a simulated scenario based on occlusion regions, according to some examples of the present disclosure.

Figure 3D:
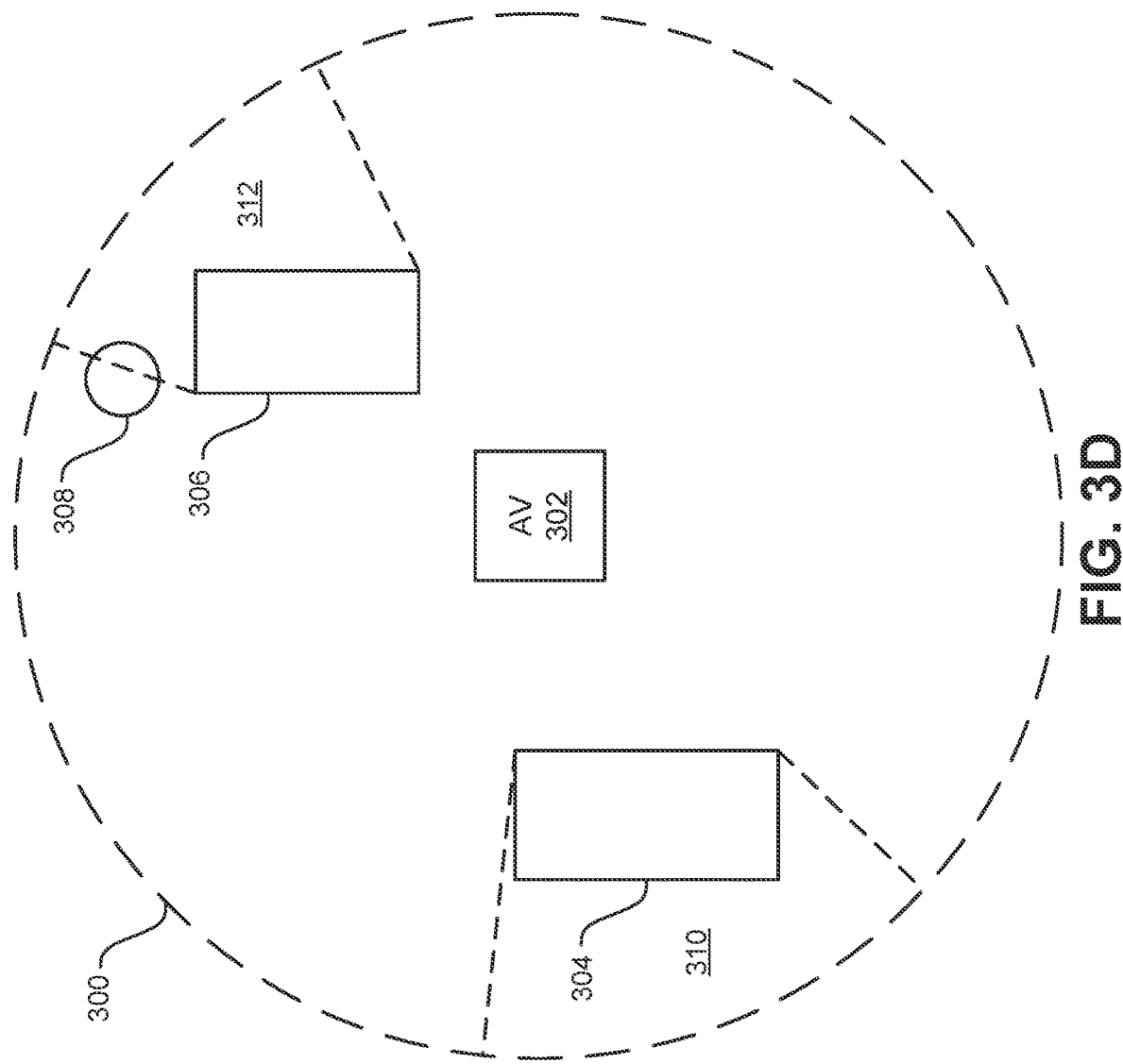

FIG. 3A illustrates a field of view 300 of an AV 302 in a simulated scenario. The field of view 300 represents a geographic area in which sensors of the AV 302 can detect objects. As shown, two surrounding objects 304, 306 and an object of interest 308 are present within the field of view 300. The surrounding objects 304, 306 and the object of interest 308 may be any type of physical objects, such as vehicles, pedestrians, buildings, bushes, trees, bicycles, and the like. The object of interest 308 is described separately from the surrounding objects 304, 306 within the example of FIGS. 3A-3D for ease of explanation, however, either of the surrounding objects 304, 306 may similarly be analyzed as an object of interest and the object of interest 308 may similarly be analyzed as a surrounding object. Further, while the example shown in FIGS. 3A-3D includes only two surrounding objects 304, 306 and one object of interest 308, this is just an example and is not meant to be limiting. The field of view 300 may include any number of surrounding objects and/or objects of interest.

The surrounding objects 304, 306 obstruct the visibility of the AV 302 and create occlusion regions within the field of view 300. The occlusion regions are regions within the field of view 300 in which the sensors of the AV 302 cannot detect objects. That is, the surrounding objects 304, 306 in the environment of the AV obstruct the ability of the sensors to perceive and generate data describing the occlusion regions. To determine the occlusion regions, the corner points of each surrounding object 304, 306 are identified and rays are cast from the AV 302 to intersect with each identified corner point, as is shown in FIG. 3B. Each of the shown surrounding objects 304, 306 includes four corner points at which sides or edges of the surrounding objects 304, 306 meet at an angle. Eight individual rays are cast from the AV 302 to intersect with each of the corner points.

Although four rays are cast towards each of the surrounding objects 304, 306, only the outermost rays cast towards each of the surrounding objects 304, 306 is needed to determine the occlusion region created by the respective surrounding object 304, 306. As shown in FIG. 3, the outermost rays cast towards each surrounding object are identified. The occlusion region created by each surrounding object 304, 306 is the region of the field of view 300 that falls within the outermost rays cast towards each surrounding object 304, 306 that is on the opposite side of the respective surrounding object 304, 306 from the AV 302. Accordingly, the AV 302 has visibility of the region between the outermost rays that falls between the AV 302 and each surrounding object 304, 306, while the surrounding objects 304, 306 obstruct the visibility of the AV 302 in the region between the outermost rays that falls on the opposite side of the surrounding object 304, 306 from the AV 302.

FIG. 3D illustrates the obstruction regions 310, 312 that are created by each of the surrounding objects 304, 306. As shown, the object of interest 308 falls partially within the obstruction region 312 that is created by one of the surrounding objects 306. The obstruction region 312 can be used to determine what portion of the object of interest 308 is visible to the AV 302. For example, the visibility of the object of interest 308 to the AV 302 is determined based on the portion of the object of interest 308 (e.g., portion of the bounding box of the object of interest) that does not fall within the occlusion region 312. Accordingly, the visibility of the object of interest 308 can be determined by determining the portion of the object of interest 308 that falls within and/or does not fall within any of the occlusion regions 310, 312.

Figure 4:
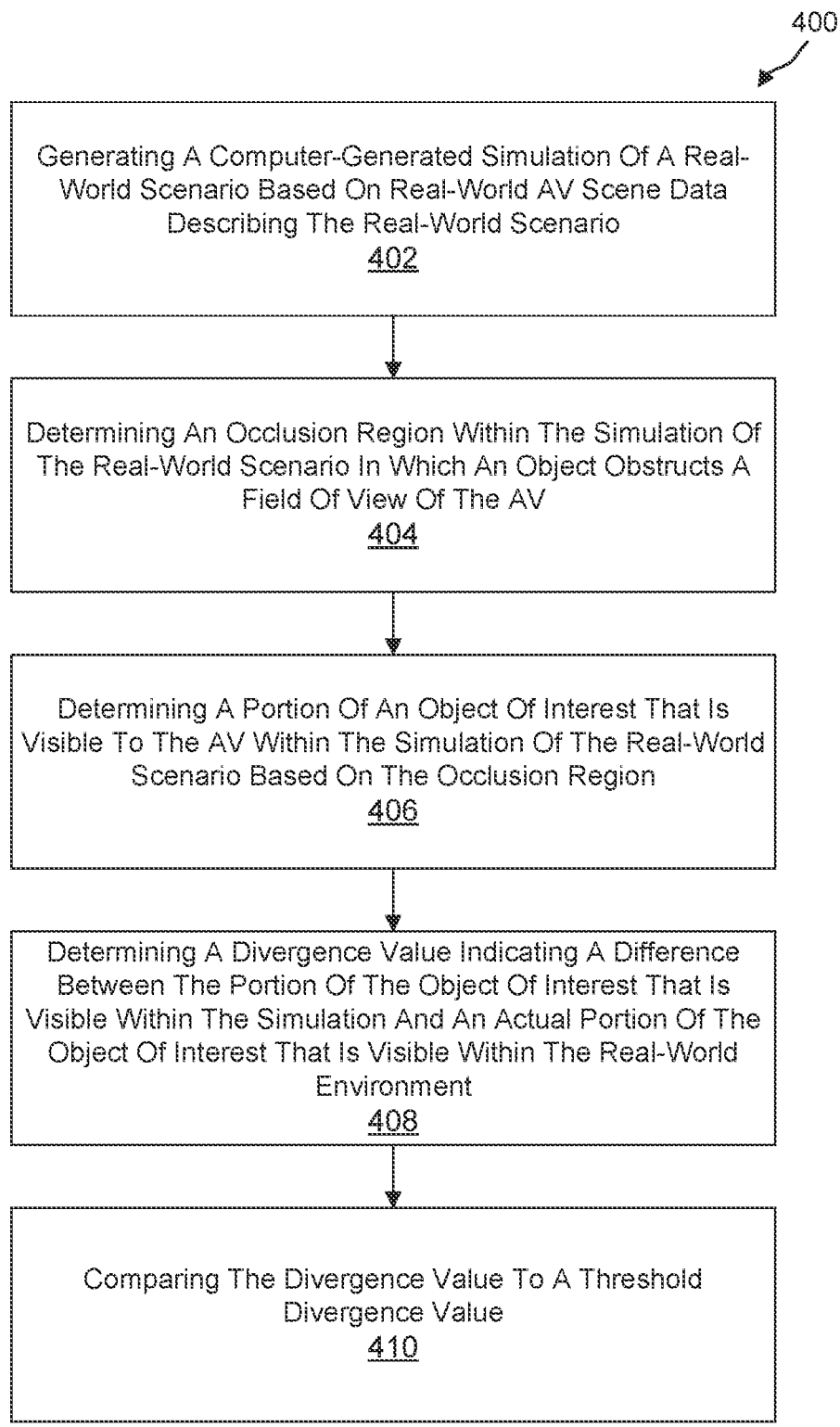
FIG. 4 is a flowchart diagram illustrating an example process for validating visibility of the objects in a simulated real-world environment, according to some examples of the present disclosure.

FIG. 4 is a flowchart diagram illustrating an example process 400 for validating visibility of the objects in a simulated real-world environment, according to some examples of the present disclosure.

At block 402, the process 400 includes generating a computer-generated simulation of a real-world scenario based on real-world AV scene data describing the real-world scenario. The simulation generation component 204 generates simulations of real-world environments. For example, real-world AV scene describing a real-world scenario can be used to generate a simulation of the real-world scenario. This includes placement of the objects within the simulation to match the positions of the objects relative to the AV in the real-world environment, as well as configuring the behavior of AV and the objects within the simulation in a manner that matches their behavior in the real-world environment. For example, the speed, trajectory and/or pose of the AV and the surrounding objects within the simulation may be configured to match the speed, trajectory and/or pose of the AV and the surrounding objects that occurred in the real-world environment.

At block 404, the process 400 includes determining an occlusion region within the simulation of the real-world scenario in which an object obstructs a field of view of the AV. To determine the occlusion region, edge points of the object are identified and rays intersecting each edge point are cast from the position of the EV. A pair of outermost rays are identified and used along with a position of the object in relation to the AV to determine the occlusion region. For example, the occlusion region is the region that falls within the pair of outermost rays and that is on the opposite side of the object from the position of the AV. In some embodiments, the occlusion region within the simulation of the real-world scenario can be determined using the process 500 described in relation to FIG. 5.

At block 406, the process 400 includes determining a portion of an object of interest that is visible to the AV within the simulation of the real-world scenario based on the occlusion region. In some embodiments, a bounding box defining the size and location of the object of interest can be used along with the occlusion region to determine the portion of the object of interest that is visible to the AV. For example, the location of the occlusion region and the bounding box can be compared to determine a portion (e.g., percentage, proportion) of the bounding box that falls within and/or does not fall within the occlusion region.

At block 408, the process 400 includes determining a divergence value indicating a difference between the portion of the object of interest that is visible within the simulation and an actual portion of the object of interest that is visible within the real-world environment. The actual portion of the object of interest that is visible to the AV within the real-world scenario may be determined based on the real-world AV scene data used to generate the simulated real-world environment. The divergence value may be determined by compare the portion of the object that is visible to the AV within the simulation of the real-world scenario to the actual portion of the object that is visible to the AV that is determined based on the real-world AV scene data.

The divergence value may be used to validate or otherwise gauge the quality of the simulation the of real-world scenario. For example, at block 410 the process 400 includes comparing the divergence value to a threshold divergence value. The divergence value exceeding the threshold divergence value may indicate poor or suboptimal accuracy of the simulation a real-world scenario. Alternatively, the divergence value falling below the threshold divergence value may indicate that the simulation is accurately simulating the real-world scenario.

Figure 5:
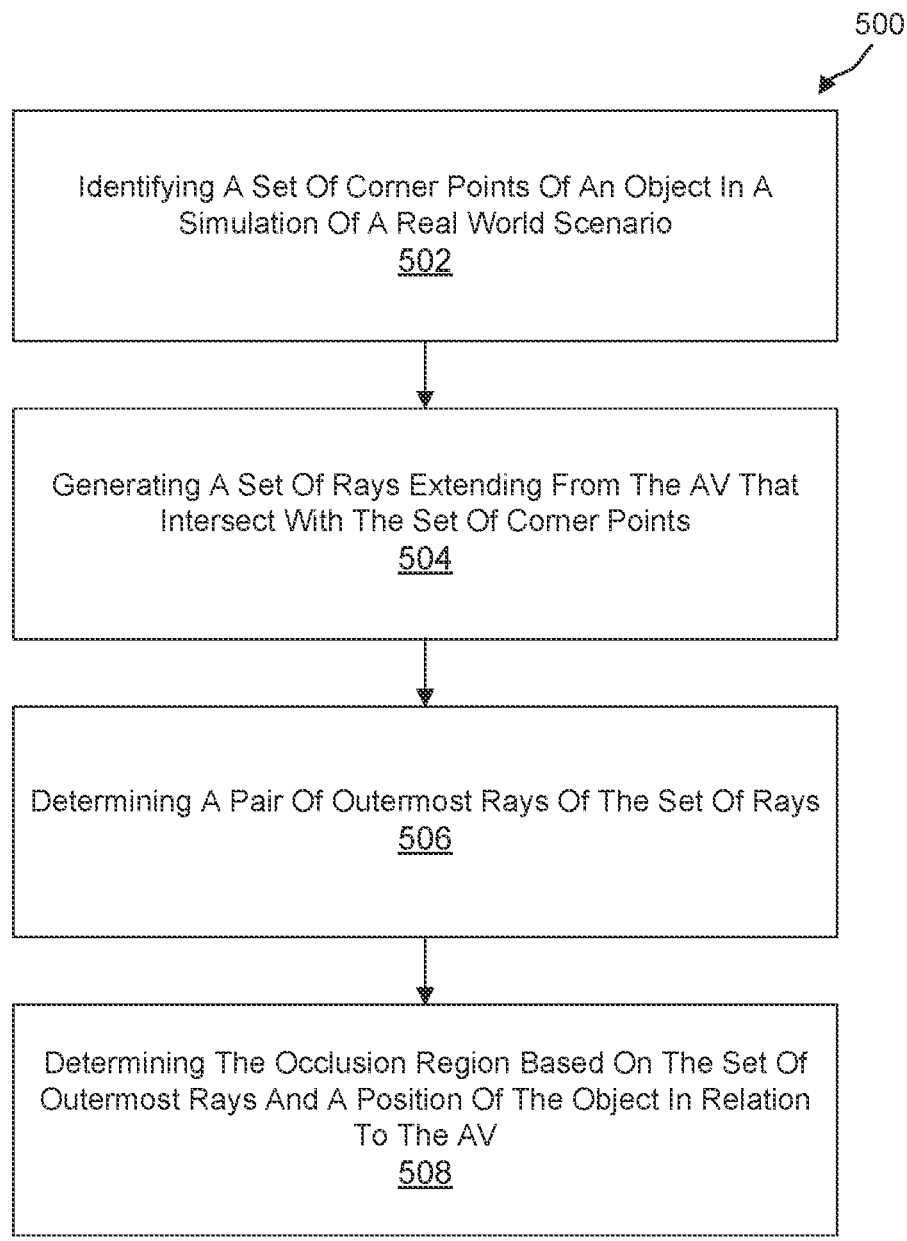
FIG. 5 is a flowchart diagram illustrating an example process for determining occlusion regions in a simulated real-world environment, according to some examples of the present disclosure.

FIG. 5 is a flowchart diagram illustrating an example process for determining occlusion regions in a simulated real-world environment, according to some examples of the present disclosure.

At block 502, the process 500 includes identifying a set of corner points of an object in a simulation of the real-world scenario. A corner point can represent a point on the edge of an object at which two or more sides or edges of the object meet at an angle. For example, an object such as a square or rectangle includes four corner points at which each side of the square or rectangle meet. As another example, a corner point may represent a point of a rounded object along which a tangent ray may be cast from a position of the AV. In some embodiments, the corner points of an object are determined based on a bounding box associated with the object that defines a shape an size of the object. Alternatively, in some embodiment, the corner points of an object are determined based the real-world AV scene data used to generate the simulation of the real-world scenario.

At block 504, the process includes generating a set of rays extending from the AV that intersect with the set of corner points. Each ray is a straight line originating from the position of the AV towards one of the identified corner points.

At block 506, the process includes determining a pair of outermost rays of the set of rays. The pair of outermost rays are the rays cast towards an object that do not fall within two of the other rays cast towards the object. The pair of outermost rays are determine the occlusion region created by the corresponding object within the simulation of the AV scenario.

At block 508, the process includes determining the occlusion region based on the set of outermost rays the a position of the object in relation to the AV. As the object obstructs the visibility of the AV within the simulation of the AV scenario, the occlusion region created by the object is defined by the region within the pair of outermost rays cast towards the object that falls on the opposite side of the object from the position of the AV. In other words, the AV maintains visibility within the region that falls between AV and the object, but the visibility of the AV is obstructed in the region within the pair of rays cast towards the object that fall beyond the object from the AV.

Figure 6:
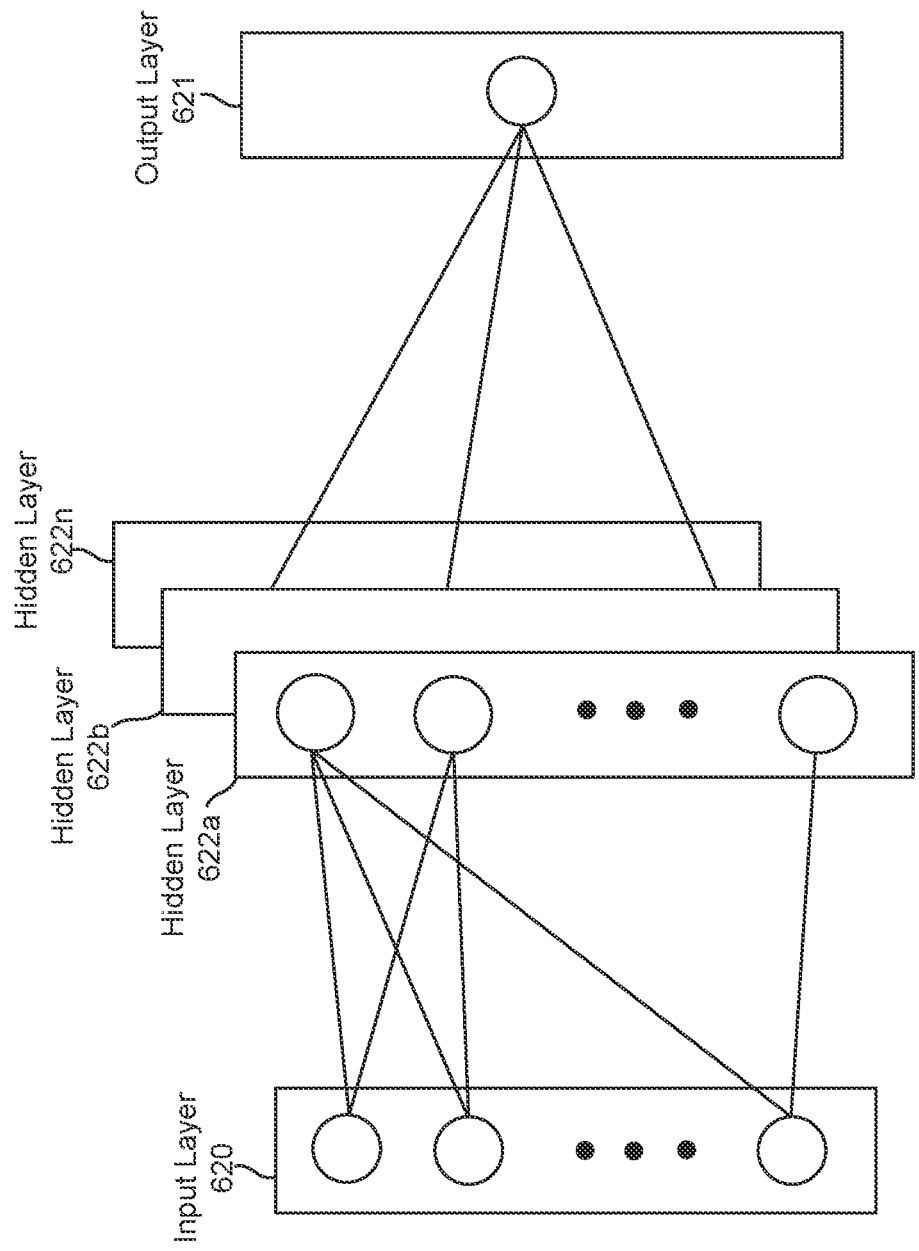
FIG. 6 illustrates an example of a deep learning neural network that can be used in accordance with some examples of the present disclosure.

FIG. 6 illustrates an example of a deep learning neural network 600 that can be used in accordance with some examples of the present disclosure. As shown, an input layer 620 can be configured to receive new/modified AV scenarios (e.g., simulation scenario for training machine learning model to handle rare events). The neural network 600 includes multiple hidden layers 622a, 622b, through 622n. The hidden layers 622a, 622b, through 622n include "n" number of hidden layers, where "n" is an integer greater than or equal to one. The number of hidden layers can be made to include as many layers as needed for the given application. The neural network 600 further includes an output layer 621 that provides an output resulting from the processing performed by the hidden layers 622a, 622b, through 622n. In one illustrative example, the output layer 621 can provide a likelihood value that can represent the probability of a new AV scenario occurring in real-life.

The neural network 600 is a multi-layer neural network of interconnected nodes. Each node can represent a piece of information. Information associated with the nodes is shared among the different layers and each layer retains information as information is processed. In some cases, the neural network 600 can include a feed-forward network, in which case there are no feedback connections where outputs of the network are fed back into itself. In some cases, the neural network 600 can include a recurrent neural network, which can have loops that allow information to be carried across nodes while reading in input.

Information can be exchanged between nodes through node-to-node interconnections between the various layers. Nodes of the input layer 620 can activate a set of nodes in the first hidden layer 622a. For example, as shown, each of the input nodes of the input layer 620 is connected to each of the nodes of the first hidden layer 622a. The nodes of the first hidden layer 622a can transform the information of each input node by applying activation functions to the input node information. The information derived from the transformation can then be passed to and can activate the nodes of the next hidden layer 622b, which can perform their own designated functions. Example functions include convolutional, up-sampling, data transformation, and/or any other suitable functions. The output of the hidden layer 622b can then activate nodes of the next hidden layer, and so on. The output of the last hidden layer 622n can activate one or more nodes of the output layer 621, at which an output is provided. In some cases, while nodes in the neural network 600 are shown as having multiple output lines, a node can have a single output and all lines shown as being output from a node represent the same output value.

In some cases, each node or interconnection between nodes can have a weight that is a set of parameters derived from the training of the neural network 600. Once the neural network 600 is trained, it can be referred to as a trained neural network, which can be used to classify one or more activities. For example, an interconnection between nodes can represent a piece of information learned about the interconnected nodes. The interconnection can have a tunable numeric weight that can be tuned (e.g., based on a training dataset), allowing the neural network 600 to be adaptive to inputs and able to learn as more and more data is processed.

The neural network 600 is pre-trained to process the features from the data in the input layer 620 using the different hidden layers 622a, 622b, through 622n in order to provide the output through the output layer 621.

In some cases, the neural network 600 can adjust the weights of the nodes using a training process called backpropagation. A backpropagation process can include a forward pass, a loss function, a backward pass, and a weight update. The forward pass, loss function, backward pass, and parameter/weight update is performed for one training iteration. The process can be repeated for a certain number of iterations for each set of training data until the neural network 600 is trained well enough so that the weights of the layers are accurately tuned.

To perform training, a loss function can be used to analyze error in the output. Any suitable loss function definition can be used, such as a Cross-Entropy loss. Another example of a loss function includes the mean squared error (MSE), defined as $E\_total = \Sigma (1/2 \text{ (target-output)}^{\wedge}2)$. The loss can be set to be equal to the value of E_total.

The loss (or error) will be high for the initial training data since the actual values will be much different than the predicted output. The goal of training is to minimize the amount of loss so that the predicted output is the same as the training output. The neural network 600 can perform a backward pass by determining which inputs (weights) most contributed to the loss of the network, and can adjust the weights so that the loss decreases and is eventually minimized.

The neural network 600 can include any suitable deep network. One example includes a Convolutional Neural Network (CNN), which includes an input layer and an output layer, with multiple hidden layers between the input and out layers. The hidden layers of a CNN include a series of convolutional, nonlinear, pooling (for downsampling), and fully connected layers. The neural network 600 can include any other deep network other than a CNN, such as an autoencoder, Deep Belief Nets (DBNs), Recurrent Neural Networks (RNNs), among others.

As understood by those of skill in the art, machine-learning based classification techniques can vary depending on the desired implementation. For example, machine-learning classification schemes can utilize one or more of the following, alone or in combination: hidden Markov models; RNNs; CNNs; deep learning; Bayesian symbolic methods; Generative Adversarial Networks (GANs); support vector machines; image registration methods; and applicable rule-based systems. Where regression algorithms are used, they may include but are not limited to: a Stochastic Gradient Descent Regressor, a Passive Aggressive Regressor, etc.

Machine learning classification models can also be based on clustering algorithms (e.g., a Mini-batch K-means clustering algorithm), a recommendation algorithm (e.g., a Min-wise Hashing algorithm, or Euclidean Locality-Sensitive Hashing (LSH) algorithm), and/or an anomaly detection algorithm, such as a local outlier factor. Additionally, machine-learning models can employ a dimensionality reduction approach, such as, one or more of: a Mini-batch Dictionary Learning algorithm, an incremental Principal Component Analysis (PCA) algorithm, a Latent Dirichlet Allocation algorithm, and/or a Mini-batch K-means algorithm, etc.

Figure 7:
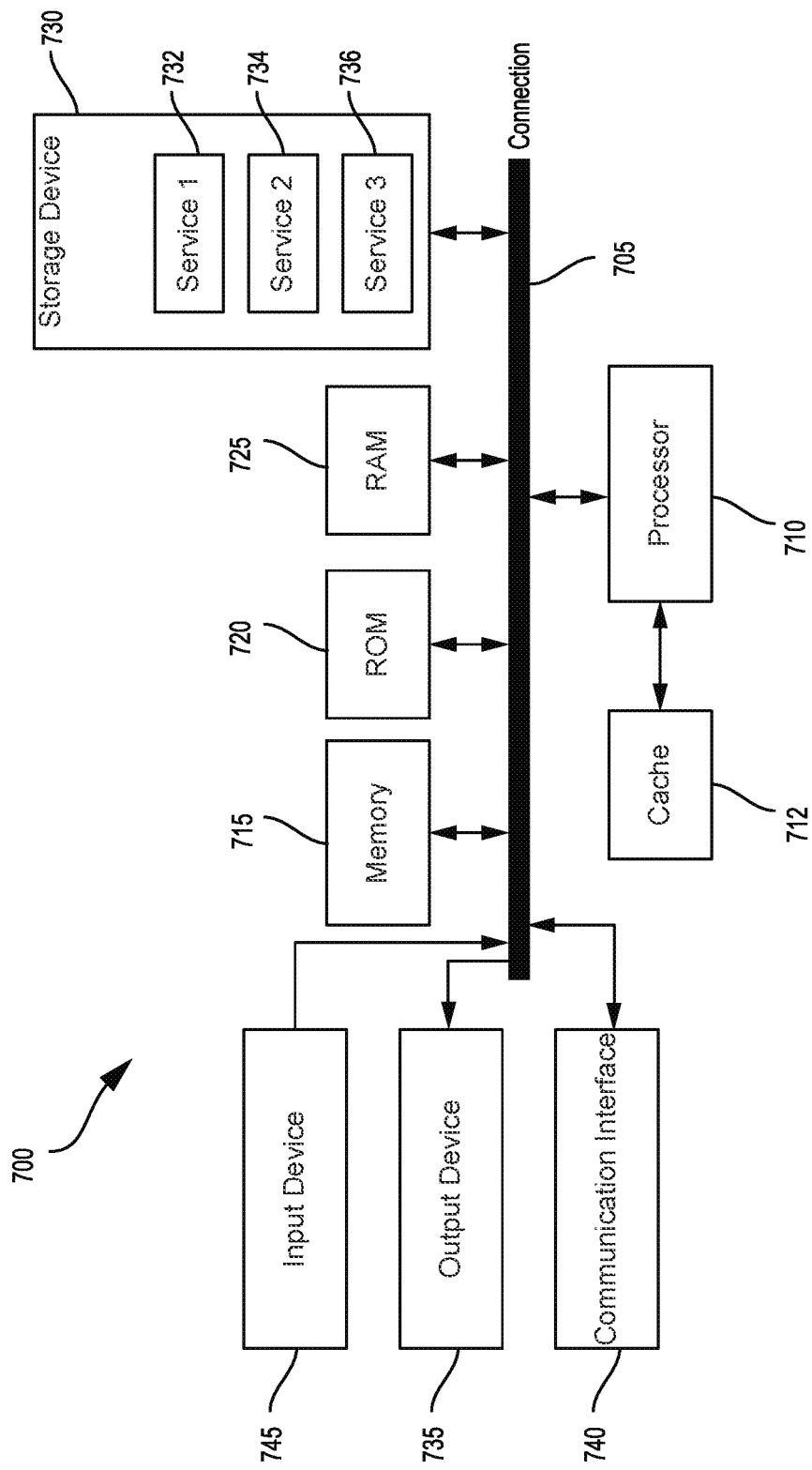
FIG. 7 is a diagram illustrating an example system architecture for implementing certain aspects described herein.

FIG. 7 illustrates an example processor-based system with which some aspects of the subject technology can be implemented. For example, processor-based system 700 can be any computing device making up internal computing system 110, a passenger device executing the ridesharing application 172, or any component thereof in which the components of the system are in communication with each other using connection 705. Connection 705 can be a physical connection via a bus, or a direct connection into processor 710, such as in a chipset architecture. Connection 705 can also be a virtual connection, networked connection, or logical connection.

In some examples, computing system 700 is a distributed system in which the functions described in this disclosure can be distributed within a datacenter, multiple data centers, a peer network, etc. In some cases, one or more of the described system components represents many such components each performing some or all of the function for which the component is described. In some aspects, the components can be physical or virtual devices.

Example system 700 includes at least one processing unit (CPU or processor) 710 and connection 705 that couples various system components including system memory 715, such as read-only memory (ROM) 720 and random-access memory (RAM) 725 to processor 710. Computing system 700 can include a cache of high-speed memory 712 connected directly with, in close proximity to, and/or integrated as part of processor 710.

Processor 710 can include any general-purpose processor and a hardware service or software service, such as services 732, 734, and 736 stored in storage device 730, configured to control processor 710 as well as a special-purpose processor where software instructions are incorporated into the actual processor design. Processor 710 may essentially be a completely self-contained computing system, containing multiple cores or processors, a bus, memory controller, cache, etc. A multi-core processor may be symmetric or asymmetric.

To enable user interaction, computing system 700 can include an input device 745, which can represent any number of input mechanisms, such as a microphone for speech, a touch-sensitive screen for gesture or graphical input, keyboard, mouse, motion input, speech, etc. Computing system 700 can also include output device 735, which can be one or more of a number of output mechanisms known to those of skill in the art. In some instances, multimodal systems can enable a user to provide multiple types of input/output to communicate with computing system 700. Computing system 700 can include communications interface 740, which can generally govern and manage the user input and system output. The communication interface may perform or facilitate receipt and/or transmission wired or wireless communications via wired and/or wireless transceivers, including those making use of an audio jack/plug, a microphone jack/plug, a universal serial bus (USB) port/plug, an Apple® Lightning® port/plug, an Ethernet port/plug, a fiber optic port/plug, a proprietary wired port/plug, a BLUETOOTH® wireless signal transfer, a BLUETOOTH® low energy (BLE) wireless signal transfer, an IBEACON® wireless signal transfer, a radio-frequency identification (RFID) wireless signal transfer, near-field communications (NFC) wireless signal transfer, dedicated short range communication (DSRC) wireless signal transfer, 802.11 Wi-Fi wireless signal transfer, wireless local area network (WLAN) signal transfer, Visible Light Communication (VLC), Worldwide Interoperability for Microwave Access (WiMAX), Infrared (IR) communication wireless signal transfer, Public Switched Telephone Network (PSTN) signal transfer, Integrated Services Digital Network (ISDN) signal transfer, 3G/4G/9G/LTE cellular data network wireless signal transfer, ad-hoc network signal transfer, radio wave signal transfer, microwave signal transfer, infrared signal transfer, visible light signal transfer, ultraviolet light signal transfer, wireless signal transfer along the electromagnetic spectrum, or some combination thereof.

Communications interface 740 may also include one or more Global Navigation Satellite System (GNSS) receivers or transceivers that are used to determine a location of the computing system 700 based on receipt of one or more signals from one or more satellites associated with one or more GNSS systems. GNSS systems include, but are not limited to, the US-based Global Positioning System (GPS), the Russia-based Global Navigation Satellite System (GLONASS), the China-based BeiDou Navigation Satellite System (BDS), and the Europe-based Galileo GNSS. There is no restriction on operating on any particular hardware arrangement, and therefore the basic features here may easily be substituted for improved hardware or firmware arrangements as they are developed.

Storage device 730 can be a non-volatile and/or non-transitory computer-readable memory device and can be a hard disk or other types of computer readable media which can store data that are accessible by a computer, such as magnetic cassettes, flash memory cards, solid state memory devices, digital versatile disks, cartridges, a floppy disk, a flexible disk, a hard disk, magnetic tape, a magnetic strip/stripe, any other magnetic storage medium, flash memory, memristor memory, any other solid-state memory, a compact disc read only memory (CD-ROM) optical disc, a rewritable compact disc (CD) optical disc, digital video disk (DVD) optical disc, a blu-ray disc (BDD) optical disc, a holographic optical disk, another optical medium, a secure digital (SD) card, a micro secure digital (microSD) card, a Memory Stick® card, a smartcard chip, a EMV chip, a subscriber identity module (SIM) card, a mini/micro/nano/pico SIM card, another integrated circuit (IC) chip/card, random access memory (RAM), static RAM (SRAM), dynamic RAM (DRAM), read-only memory (ROM), programmable read-only memory (PROM), erasable programmable read-only memory (EPROM), electrically erasable programmable read-only memory (EEPROM), flash EPROM (FLASHEPROM), cache memory (L1/L2/L3/L4/L9/L #), resistive random-access memory (RRAM/ReRAM), phase change memory (PCM), spin transfer torque RAM (STT-RAM), another memory chip or cartridge, and/or a combination thereof.

Storage device 730 can include software services, servers, services, etc., that when the code that defines such software is executed by the processor 710, causes the system to perform a function. In some examples, a hardware service that performs a particular function can include the software component stored in a computer-readable medium in connection with the necessary hardware components, such as processor 710, connection 705, output device 735, etc., to carry out the function.

As understood by those of skill in the art, machine-learning techniques can vary depending on the desired implementation. For example, machine-learning schemes can utilize one or more of the following, alone or in combination: hidden Markov models; recurrent neural networks; convolutional neural networks (CNNs); deep learning; Bayesian symbolic methods; general adversarial networks (GANs); support vector machines; image registration methods; applicable rule-based system. Where regression algorithms are used, they may include including but are not limited to: a Stochastic Gradient Descent Regressor, and/or a Passive Aggressive Regressor, etc.

Machine learning classification models can also be based on clustering algorithms (e.g., a Mini-batch K-means clustering algorithm), a recommendation algorithm (e.g., a Miniwise Hashing algorithm, or Euclidean Locality-Sensitive Hashing (LSH) algorithm), and/or an anomaly detection algorithm, such as a Local outlier factor. Additionally, machine-learning models can employ a dimensionality reduction approach, such as, one or more of: a Mini-batch Dictionary Learning algorithm, an Incremental Principal Component Analysis (PCA) algorithm, a Latent Dirichlet Allocation algorithm, and/or a Mini-batch K-means algorithm, etc.

Aspects within the scope of the present disclosure may also include tangible and/or non-transitory computer-readable storage media or devices for carrying or having computer-executable instructions or data structures stored thereon. Such tangible computer-readable storage devices can be any available device that can be accessed by a general purpose or special purpose computer, including the functional design of any special purpose processor as described above. By way of example, and not limitation, such tangible computer-readable devices can include RAM, ROM, EEPROM, CD-ROM or other optical disk storage, magnetic disk storage or other magnetic storage devices, or any other device which can be used to carry or store desired program code in the form of computer-executable instructions, data structures, or processor chip design. When information or instructions are provided via a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable storage devices.

Computer-executable instructions include, for example, instructions and data which cause a general-purpose computer, special-purpose computer, or special-purpose processing device to perform a certain function or group of functions. By way of example, computer-executable instructions can be used to implement perception system functionality for determining when sensor cleaning operations are needed or should begin. Computer-executable instructions can also include program modules that are executed by computers in stand-alone or network environments. Generally, program modules include routines, programs, components, data structures, objects, and the functions inherent in the design of special-purpose processors, etc. that perform tasks or implement abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Other examples of the disclosure may be practiced in network computing environments with many types of computer system configurations, including personal computers, hand-held devices, multi-processor systems, microprocessor-based or programmable consumer electronics, network PCs, minicomputers, mainframe computers, and the like. Aspects of the disclosure may also be practiced in distributed computing environments where tasks are performed by local and remote processing devices that are linked (either by hardwired links, wireless links, or by a combination thereof) through a communications network. In a distributed computing environment, program modules can be located in both local and remote memory storage devices.

Selected Examples

Illustrative examples of the disclosure include:

Aspect 1. A method comprising: generating, based on real-world autonomous vehicle (AV) scene data captured by sensors of an AV during a real-world scenario, a computer-generated simulation of the real-world scenario, the real-world scenario including at least one surrounding object and one object of interest; determining, based on a position of the AV and the at least one surrounding object within the simulation of the real-world scenario, an occlusion region in which the at least one surrounding object obstructs a field of view of the AV; determining, based on the occlusion region, a portion of the object of interest that is visible to the AV within the simulation of the real-world scenario; and determining a divergence value indicating a difference between the portion of the object of interest that is visible to the AV within the simulation of the real-world scenario to an actual portion of the object of interest that is visible to the AV within the real-world scenario.

Aspect 2. The method of Aspect 1, wherein determining the occlusion region comprises: identifying a set of corner points of a first surrounding object in the simulation of the real-world scenario; generating a set of rays extending from the AV and intersecting with the set of corner points of the first surrounding object; and determining the occlusion region based on the set rays and a position of the first surrounding object in relation to the AV.

Aspect 3. The method of any of Aspects 1 to 2, wherein determining the occlusion region based on the set rays and the position of the first surrounding object in relation to the AV further comprises: determining a pair of outermost rays of the set of rays; and determining the occlusion region based on the set of outermost rays of the set of rays.

Aspect 4. The method of any of Aspects 1 to 3, further comprising: identifying a set of corner points of a second surrounding object in the simulation of the real-world scenario; generating a second set of rays extending from the AV and intersecting with the set of corner points of the second surrounding object; and determining the occlusion region based on the second set rays and a position of second surrounding object in relation to the AV.

Aspect 5. The method of any of Aspects 1 to 4, wherein determining the portion of the object of interest that is visible to the AV within the simulation of the real-world scenario comprises: determining a portion of a bounding box of the object of interest that is not included in the occlusion region.

Aspect 6. The method of any of Aspects 1 to 5, further comprising: determining the actual portion of the object of interest that is visible to the AV within the real-world scenario based on the real-world AV scene data captured by the sensors of the AV during a real-world scenario.

Aspect 7. The method of any of Aspects 1 to 6, further comprising: comparing the divergence value to a threshold divergence value; and validating accuracy of the simulation of the real-world scenario based on comparing the divergence value to the threshold divergence value.

Aspect 8. A system comprising: one or more computer processors; and one or more computer-readable mediums storing instructions that, when executed by the one or more computer processors, cause the system to perform operations comprising: generating, based on real-world autonomous vehicle (AV) scene data captured by sensors of an AV during a real-world scenario, a computer-generated simulation of the real-world scenario, the real-world scenario including at least one surrounding object and one object of interest; determining, based on a position of the AV and the at least one surrounding object within the simulation of the real-world scenario, an occlusion region in which the at least one surrounding object obstructs a field of view of the AV; determining, based on the occlusion region, a portion of the object of interest that is visible to the AV within the simulation of the real-world scenario; and determining a divergence value indicating a difference between the portion of the object of interest that is visible to the AV within the simulation of the real-world scenario to an actual portion of the object of interest that is visible to the AV within the real-world scenario.

Aspect 9. The system of Aspect 1, wherein determining the occlusion region comprises: identifying a set of corner points of a first surrounding object in the simulation of the real-world scenario; generating a set of rays extending from the AV and intersecting with the set of corner points of the first surrounding object; and determining the occlusion region based on the set rays and a position of the first surrounding object in relation to the AV.

Aspect 10. The system of any of Aspects 8 to 9, wherein determining the occlusion region based on the set rays and the position of the first surrounding object in relation to the AV further comprises: determining a pair of outermost rays of the set of rays; and determining the occlusion region based on the set of outermost rays of the set of rays.

Aspect 11. The system of any of Aspects 8 to 10, the operations further comprising: identifying a set of corner points of a second surrounding object in the simulation of the real-world scenario; generating a second set of rays extending from the AV and intersecting with the set of corner points of the second surrounding object; and determining the occlusion region based on the second set rays and a position of second surrounding object in relation to the AV.

Aspect 12. The system of any of Aspects 8 to 11, wherein determining the portion of the object of interest that is visible to the AV within the simulation of the real-world scenario comprises: determining a portion of a bounding box of the object of interest that is not included in the occlusion region.

Aspect 13. The system of any of Aspects 8 to 12, the operations further comprising: determining the actual portion of the object of interest that is visible to the AV within the real-world scenario based on the real-world AV scene data captured by the sensors of the AV during a real-world scenario.

Aspect 14. The system of any of Aspects 8 to 13, the operations further comprising: comparing the divergence value to a threshold divergence value; and validating accuracy of the simulation of the real-world scenario based on comparing the divergence value to the threshold divergence value.

Aspect 15. A non-transitory computer-readable medium storing instructions that, when executed by one or more computer processors of one or more computing devices, cause the one or more computing devices to perform operations comprising: generating, based on real-world autonomous vehicle (AV) scene data captured by sensors of an AV during a real-world scenario, a computer-generated simulation of the real-world scenario, the real-world scenario including at least one surrounding object and one object of interest; determining, based on a position of the AV and the at least one surrounding object within the simulation of the real-world scenario, an occlusion region in which the at least one surrounding object obstructs a field of view of the AV; determining, based on the occlusion region, a portion of the object of interest that is visible to the AV within the simulation of the real-world scenario; and determining a divergence value indicating a difference between the portion of the object of interest that is visible to the AV within the simulation of the real-world scenario to an actual portion of the object of interest that is visible to the AV within the real-world scenario.

Aspect 16. The non-transitory computer-readable medium of Aspect 15, wherein determining the occlusion region comprises: identifying a set of corner points of a first surrounding object in the simulation of the real-world scenario; generating a set of rays extending from the AV and intersecting with the set of corner points of the first surrounding object; and determining the occlusion region based on the set rays and a position of the first surrounding object in relation to the AV.

Aspect 17. The non-transitory computer-readable medium of any of Aspects 15 to 16, wherein determining the occlusion region based on the set rays and the position of the first surrounding object in relation to the AV further comprises: determining a pair of outermost rays of the set of rays; and determining the occlusion region based on the set of outermost rays of the set of rays.

Aspect 18. The non-transitory computer-readable medium of any of Aspects 15 to 17, the operations further comprising: identifying a set of corner points of a second surrounding object in the simulation of the real-world scenario; generating a second set of rays extending from the AV and intersecting with the set of corner points of the second surrounding object; and determining the occlusion region based on the second set rays and a position of second surrounding object in relation to the AV.

Aspect 19. The non-transitory computer-readable medium of any of Aspects 15 to 18, wherein determining the portion of the object of interest that is visible to the AV within the simulation of the real-world scenario comprises: determining a portion of a bounding box of the object of interest that is not included in the occlusion region.

Aspect 20. The non-transitory computer-readable medium of any of Aspects 15 to 19, the operations further comprising: determining the actual portion of the object of interest that is visible to the AV within the real-world scenario based on the real-world AV scene data captured by the sensors of the AV during a real-world scenario.

The various examples described above are provided by way of illustration only and should not be construed to limit the scope of the disclosure. For example, the principles herein apply equally to optimization as well as general improvements. Various modifications and changes may be made to the principles described herein without following the examples and applications illustrated and described herein, and without departing from the scope of the disclosure.

Claim language or other language in the disclosure reciting "at least one of" a set and/or "one or more" of a set indicates that one member of the set or multiple members of the set (in any combination) satisfy the claim. For example, claim language reciting "at least one of A and B" or "at least one of A or B" means A, B, or A and B. In another example, claim language reciting "at least one of A, B, and C" or "at least one of A, B, or C" means A, B, C, or A and B, or A and C, or B and C, or A and B and C. The language "at least one of" a set and/or "one or more" of a set does not limit the set to the items listed in the set. For example, claim language reciting "at least one of A and B" or "at least one of A or B" can mean A, B, or A and B, and can additionally include items not listed in the set of A and B.

What is claimed is:

1. A method comprising:
generating, based on real-world autonomous vehicle (AV) scene data captured by sensors of an AV during a real-world scenario, a computer-generated simulation of the real-world scenario, the real-world scenario including at least one surrounding object and one object of interest;
determining, based on a position of the AV and the at least one surrounding object within the simulation of the real-world scenario, an occlusion region in which the at least one surrounding object obstructs a field of view of the AV;
determining, based on the occlusion region, a portion of the object of interest that is visible to the AV within the simulation of the real-world scenario; and
determining a divergence value indicating a difference between the portion of the object of interest that is visible to the AV within the simulation of the real-world scenario to an actual portion of the object of interest that is visible to the AV within the real-world scenario.

2. The method of claim 1, wherein determining the occlusion region comprises:
identifying a set of corner points of a first surrounding object in the simulation of the real-world scenario;
generating a set of rays extending from the AV and intersecting with the set of corner points of the first surrounding object; and
determining the occlusion region based on the set rays and a position of the first surrounding object in relation to the AV.

3. The method of claim 2, wherein determining the occlusion region based on the set rays and the position of the first surrounding object in relation to the AV further comprises:
determining a pair of outermost rays of the set of rays; and
determining the occlusion region based on the set of outermost rays of the set of rays.

4. The method of claim 1, further comprising:
identifying a set of corner points of a second surrounding object in the simulation of the real-world scenario;
generating a second set of rays extending from the AV and intersecting with the set of corner points of the second surrounding object; and
determining the occlusion region based on the second set rays and a position of second surrounding object in relation to the AV.

5. The method of claim 1, wherein determining the portion of the object of interest that is visible to the AV within the simulation of the real-world scenario comprises:
determining a portion of a bounding box of the object of interest that is not included in the occlusion region.

6. The method of claim 1, further comprising:
determining the actual portion of the object of interest that is visible to the AV within the real-world scenario based on the real-world AV scene data captured by the sensors of the AV during the real-world scenario.

7. The method of claim 1, further comprising:
comparing the divergence value to a threshold divergence value; and
validating accuracy of the simulation of the real-world scenario based on comparing the divergence value to the threshold divergence value.

8. A system comprising:
one or more computer processors; and
one or more computer-readable mediums storing instructions that, when executed by the one or more computer processors, cause the system to perform operations comprising:
generating, based on real-world autonomous vehicle (AV) scene data captured by sensors of an AV during a real-world scenario, a computer-generated simulation of the real-world scenario, the real-world scenario including at least one surrounding object and one object of interest;
determining, based on a position of the AV and the at least one surrounding object within the simulation of the real-world scenario, an occlusion region in which the at least one surrounding object obstructs a field of view of the AV;
determining, based on the occlusion region, a portion of the object of interest that is visible to the AV within the simulation of the real-world scenario; and
determining a divergence value indicating a difference between the portion of the object of interest that is visible to the AV within the simulation of the real-world scenario to an actual portion of the object of interest that is visible to the AV within the real-world scenario.

9. The system of claim 8, wherein determining the occlusion region comprises:
identifying a set of corner points of a first surrounding object in the simulation of the real-world scenario;
generating a set of rays extending from the AV and intersecting with the set of corner points of the first surrounding object; and
determining the occlusion region based on the set rays and a position of the first surrounding object in relation to the AV.

10. The system of claim 9, wherein determining the occlusion region based on the set rays and the position of the first surrounding object in relation to the AV further comprises:
determining a pair of outermost rays of the set of rays; and
determining the occlusion region based on the set of outermost rays of the set of rays.

11. The system of claim 8, the operations further comprising:
identifying a set of corner points of a second surrounding object in the simulation of the real-world scenario;
generating a second set of rays extending from the AV and intersecting with the set of corner points of the second surrounding object; and
determining the occlusion region based on the second set rays and a position of second surrounding object in relation to the AV.

12. The system of claim 8, wherein determining the portion of the object of interest that is visible to the AV within the simulation of the real-world scenario comprises:
determining a portion of a bounding box of the object of interest that is not included in the occlusion region.

13. The system of claim 8, the operations further comprising:
determining the actual portion of the object of interest that is visible to the AV within the real-world scenario based on the real-world AV scene data captured by the sensors of the AV during the real-world scenario.

14. The system of claim 8, the operations further comprising:
  comparing the divergence value to a threshold divergence value; and
  validating accuracy of the simulation of the real-world scenario based on comparing the divergence value to the threshold divergence value.

15. A non-transitory computer-readable medium storing instructions that, when executed by one or more computer processors of one or more computing devices, cause the one or more computing devices to perform operations comprising:
  generating, based on real-world autonomous vehicle (AV) scene data captured by sensors of an AV during a real-world scenario, a computer-generated simulation of the real-world scenario, the real-world scenario including at least one surrounding object and one object of interest;
  determining, based on a position of the AV and the at least one surrounding object within the simulation of the real-world scenario, an occlusion region in which the at least one surrounding object obstructs a field of view of the AV;
  determining, based on the occlusion region, a portion of the object of interest that is visible to the AV within the simulation of the real-world scenario; and
  determining a divergence value indicating a difference between the portion of the object of interest that is visible to the AV within the simulation of the real-world scenario to an actual portion of the object of interest that is visible to the AV within the real-world scenario.

16. The non-transitory computer-readable medium of claim 15, wherein determining the occlusion region comprises:
  identifying a set of corner points of a first surrounding object in the simulation of the real-world scenario;
  generating a set of rays extending from the AV and intersecting with the set of corner points of the first surrounding object; and
  determining the occlusion region based on the set rays and a position of the first surrounding object in relation to the AV.

17. The non-transitory computer-readable medium of claim 16, wherein determining the occlusion region based on the set rays and the position of the first surrounding object in relation to the AV further comprises:
  determining a pair of outermost rays of the set of rays; and
  determining the occlusion region based on the set of outermost rays of the set of rays.

18. The non-transitory computer-readable medium of claim 15, the operations further comprising:
  identifying a set of corner points of a second surrounding object in the simulation of the real-world scenario;
  generating a second set of rays extending from the AV and intersecting with the set of corner points of the second surrounding object; and
  determining the occlusion region based on the second set rays and a position of second surrounding object in relation to the AV.

19. The non-transitory computer-readable medium of claim 15, wherein determining the portion of the object of interest that is visible to the AV within the simulation of the real-world scenario comprises:
  determining a portion of a bounding box of the object of interest that is not included in the occlusion region.

20. The non-transitory computer-readable medium of claim 15, the operations further comprising:
  determining the actual portion of the object of interest that is visible to the AV within the real-world scenario based on the real-world AV scene data captured by the sensors of the AV during the real-world scenario.

* * * * *